(12) United States Patent
Romero et al.

(10) Patent No.: US 9,911,101 B2
(45) Date of Patent: Mar. 6, 2018

(54) DUTY BLOCK TIME CONTROL VIA STATISTICAL ANALYSIS

(71) Applicant: THE BOEING COMPANY, Chicago, IL (US)

(72) Inventors: Alejandro Oswaldo Hernandez Romero, Montreal (CA); Michael J. Woicekowski, Montreal (CA); Oleksandr Basanets, Montreal (CA)

(73) Assignee: THE BOEING COMPANY, Chicago, IL (US)

(*) Notice: Subject to any disclaimer, the term of this patent is extended or adjusted under 35 U.S.C. 154(b) by 440 days.

(21) Appl. No.: 14/630,865

(22) Filed: Feb. 25, 2015

(65) Prior Publication Data

US 2016/0092846 A1 Mar. 31, 2016

Related U.S. Application Data

(63) Continuation-in-part of application No. 14/500,400, filed on Sep. 29, 2014, and a continuation-in-part of application No. 14/500,447, filed on Sep. 29, 2014.

(51) Int. Cl.
*G06Q 10/00* (2012.01)
*G06Q 10/10* (2012.01)
*G06Q 50/14* (2012.01)

(52) U.S. Cl.
CPC ......... *G06Q 10/1097* (2013.01); *G06Q 50/14* (2013.01)

(58) Field of Classification Search
CPC .............................................. G06Q 10/06311
USPC ....................................................... 705/7.13
See application file for complete search history.

(56) References Cited

U.S. PATENT DOCUMENTS

| | | | | |
|---|---|---|---|---|
| 7,085,726 B1* | 8/2006 | Galperin | ................ | G06Q 10/02 705/5 |
| 8,615,418 B1* | 12/2013 | Niznik | ................ | G06Q 10/02 701/120 |
| 8,874,459 B1* | 10/2014 | Green | .................. | G06Q 10/02 701/120 |
| 2008/0059273 A1* | 3/2008 | Miller | ................... | G06Q 10/04 705/7.31 |
| 2009/0006160 A1* | 1/2009 | Boegner | ................ | G06Q 10/06 705/7.16 |
| 2009/0132332 A1* | 5/2009 | Belenky | .............. | G06Q 10/109 705/7.13 |

(Continued)

OTHER PUBLICATIONS

"Fact Sheet—Pilot Flight Time, Rest, and Fatigue." Jan. 27, 2010. Retrieved from [URL: https://www.faa.gov/news/fact_sheets/news_story.cfm?newsId=6762].*

*Primary Examiner* — Susanna M. Diaz
(74) *Attorney, Agent, or Firm* — Patterson + Sheridan, LLP

(57) ABSTRACT

Method and apparatus for statistically determining buffers for time variances for scheduled operations. Buffers for a particular operation can be based on a statistical analysis of past instances of the specific operation, and a buffer can be applied based on a selected statistical confidence interval. The statistical analysis can include determining a Gumbel distribution for time variances for a particular operation. Once buffers have been determined for the various operations, itineraries of operations can be prepared such that the scheduled times plus the buffer times for the operations in an itinerary do not exceed personnel limits of the personnel who may be assigned to the itineraries.

17 Claims, 17 Drawing Sheets

| | Flight # | Departure Airport | Arrival Airport | Aircraft Type | Day of Week | Departure Time Start Range | Departure Time End Range | 80% | 90% | 95% | 97% | K |
|---|---|---|---|---|---|---|---|---|---|---|---|---|
| 1102 | 111 | JFK | LAX | 737 | * | 6:00 | 8:00 | 5 | 17 | 38 | 69 | 1 |
| 1104 | * | JFK | LAX | 737 | M | 0:00 | 23:59 | 5 | 18 | 39 | 67 | 2 |
| 1106 | * | JFK | LAX | 737 | Sat. | 0:00 | 23:59 | 1 | 5 | 10 | 15 | 3 |
| 1108 | * | JFK | LAX | 737 | * | 6:00 | 14:00 | 7 | 22 | 46 | 70 | 4 |

1100

(56) References Cited

U.S. PATENT DOCUMENTS

| | | | |
|---|---|---|---|
| 2010/0082383 A1* | 4/2010 | Pachon | G06Q 10/04 705/7.13 |
| 2012/0226647 A1* | 9/2012 | Murray | G06Q 10/06 706/47 |
| 2013/0268520 A1* | 10/2013 | Fisher | G06F 17/30554 707/723 |
| 2015/0051824 A1* | 2/2015 | Mayer | G06Q 50/30 701/120 |

* cited by examiner

| Date | Day | Arr. Time | Dev. | Rank | 97% (1 Ops.) | 90% (3 Ops.) | 80% (6 Ops.) |
|---|---|---|---|---|---|---|---|
| 1 | Sun. | 1149 | -1 | | | | |
| 2 | Mon. | 1141 | -9 | | | | |
| 3 | Tues. | 1150 | 0 | | | | |
| 4 | Wed. | 1158 | 8 | 5 | | | X |
| 5 | Thurs. | 1145 | -5 | | | | |
| 6 | Fri. | 1149 | -1 | | | | |
| 7 | Sat. | 1140 | -10 | | | | |
| 8 | Sun. | 1152 | 2 | 8 | | | |
| 9 | Mon. | 1210 | 20 | 3 | | X | X |
| 10 | Tues. | 1144 | -6 | | | | |
| 11 | Wed. | 1220 | 30 | 2 | | X | X |
| 12 | Thurs. | 1225 | 35 | 1 | X | X | X |
| 13 | Fri. | 1150 | 0 | | | | |
| 14 | Sat. | 1144 | -6 | | | | |
| 15 | Sun. | 1150 | 0 | | | | |
| 16 | Mon. | 1149 | -1 | | | | |
| 17 | Tues. | 1144 | -6 | | | | |
| 18 | Wed. | 1145 | -5 | | | | |
| 19 | Thurs. | 1208 | 18 | 4 | | | X |
| 20 | Fri. | 1150 | 0 | | | | |
| 21 | Sat. | 1139 | -11 | | | | |
| 22 | Sun. | 1151 | 1 | 9 | | | |
| 23 | Mon. | 1153 | 3 | 7 | | | |
| 24 | Tues. | 1141 | -9 | | | | |
| 25 | Wed. | 1156 | 6 | 6 | | | X |
| 26 | Thurs. | 1148 | -2 | | | | |
| 27 | Fri. | 1148 | -2 | | | | |
| 28 | Sat. | 1147 | -3 | | | | |
| 29 | Sun. | 1144 | -6 | | | | |
| 30 | Mon. | 1150 | 0 | | | | |

FIG. 2A

| Date | Day | Block T. | Dev. | Rank | 97% (1 Ops.) | 90% (3 Ops.) | 80% (6 Ops.) |
|---|---|---|---|---|---|---|---|
| 1 | Sun. | 2:29 | -1 | | | | |
| 2 | Mon. | 2:21 | -9 | | | | |
| 3 | Tues. | 2:30 | 0 | | | | |
| 4 | Wed. | 2:38 | 8 | 5 | | | X |
| 5 | Thurs. | 2:25 | -5 | | | | |
| 6 | Fri. | 2:29 | -1 | | | | |
| 7 | Sat. | 2:20 | -10 | | | | |
| 8 | Sun. | 2:32 | 2 | 8 | | | |
| 9 | Mon. | 2:50 | 20 | 3 | | X | X |
| 10 | Tues. | 2:24 | -6 | | | | |
| 11 | Wed. | 3:00 | 30 | 2 | | X | X |
| 12 | Thurs. | 3:05 | 35 | 1 | X | X | X |
| 13 | Fri. | 2:30 | 0 | | | | |
| 14 | Sat. | 2:24 | -6 | | | | |
| 15 | Sun. | 2:30 | 0 | | | | |
| 16 | Mon. | 2:29 | -1 | | | | |
| 17 | Tues. | 2:24 | -6 | | | | |
| 18 | Wed. | 2:25 | -5 | | | | |
| 19 | Thurs. | 2:48 | 18 | 4 | | | X |
| 20 | Fri. | 2:30 | 0 | | | | |
| 21 | Sat. | 2:19 | -11 | | | | |
| 22 | Sun. | 2:31 | 1 | 9 | | | |
| 23 | Mon. | 2:33 | 3 | 7 | | | |
| 24 | Tues. | 2:21 | -9 | | | | |
| 25 | Wed. | 2:36 | 6 | 6 | | | X |
| 26 | Thurs. | 2:28 | -2 | | | | |
| 27 | Fri. | 2:28 | -2 | | | | |
| 28 | Sat. | 2:27 | -3 | | | | |
| 29 | Sun. | 2:24 | -6 | | | | |
| 30 | Mon. | 2:30 | 0 | | | | |

FIG. 2B

| Flight No. | From | To | Market Value | Fin. Rank | Maint. Rank | Strat. Rank | Overall Rank |
|---|---|---|---|---|---|---|---|
| 1 | ATL | DCA | $80,000 | 2 | 5 | 1 | 2.6 |
| 2 | ATL | LAX | $110,000 | 1 | 5 | 1 | 2.3 |
| 3 | ATL | TLH | $40,000 | 4 | 5 | 5 | 4.6 |
| 4 | ATL | MIA | $20,000 | 5 | 5 | 5 | 5 |
| 5 | DFW | ATL | $80,000 | 2 | 5 | 4 | 3.6 |
| 6 | DEN | ATL | $80,000 | 2 | 5 | 4 | 3.6 |
| 7 | ATL | DEN | $80,000 | 2 | 1 | 4 | 2.3 |
| 8 | ATL | SFO | $110,000 | 1 | 5 | 1 | 2.3 |
| 9 | MSY | DFW | $60,000 | 3 | 5 | 2 | 3.3 |
| 10 | ABQ | DFW | $40,000 | 4 | 5 | 4 | 4.3 |

FIG. 5A

| Overall Rank | Block Risk | Duty Risk | Rest Risk | Connection Risk |
|---|---|---|---|---|
| 1-2.5 | 99 | 98 | 99 | 97 |
| 2.6-3.5 | 98 | 97 | 98 | 96 |
| 3.6-5 | 97 | 96 | 97 | 95 |

FIG. 5B

| Flight # | Departure Airport | Arrival Airport | Aircraft Type | Day of Week | Departure Time Start Range | Departure Time End Range | 80% | 90% | 95% | 97% |
|---|---|---|---|---|---|---|---|---|---|---|
| 111 | JFK | LAX | 737 | M | 6:00 | 8:00 | 3 | 14 | 34 | 63 |
| 111 | JFK | LAX | 737 | T | 6:00 | 8:00 | 3 | 14 | 34 | 63 |
| 111 | JFK | LAX | 737 | W | 6:00 | 8:00 | 5 | 17 | 38 | 69 |
| 111 | JFK | LAX | 737 | R | 6:00 | 8:00 | 3 | 14 | 34 | 63 |
| 111 | JFK | LAX | 737 | F | 6:00 | 8:00 | 3 | 14 | 34 | 63 |
| 111 | JFK | LAX | 737 | Sat. | 6:00 | 8:00 | 1 | 5 | 10 | 15 |
| 111 | JFK | LAX | 737 | Sun. | 6:00 | 8:00 | 1 | 5 | 10 | 15 |
| 222 | JFK | LAX | 737 | M | 11:00 | 13:00 | 5 | 18 | 39 | 67 |
| 222 | JFK | LAX | 737 | T | 11:00 | 13:00 | 5 | 18 | 39 | 67 |
| 222 | JFK | LAX | 737 | W | 11:00 | 13:00 | 7 | 22 | 46 | 70 |
| 222 | JFK | LAX | 737 | R | 11:00 | 13:00 | 5 | 18 | 39 | 67 |
| 222 | JFK | LAX | 737 | F | 11:00 | 13:00 | 5 | 18 | 39 | 67 |
| 333 | JFK | LAX | 737 | Sat. | 15:00 | 16:00 | 1 | 3 | 9 | 14 |
| 333 | JFK | LAX | 737 | Sun. | 15:00 | 16:00 | 1 | 3 | 8 | 15 |

FIG. 10

| Flight # | Departure Airport | Arrival Airport | Aircraft Type | Day of Week | Departure Time Start Range | Departure Time End Range | 80% | 90% | 95% | 97% | K |
|---|---|---|---|---|---|---|---|---|---|---|---|
| 111 | JFK | LAX | 737 | * | 6:00 | 8:00 | 5 | 17 | 38 | 69 | 1 |
| * | JFK | LAX | 737 | M | 0:00 | 23:59 | 5 | 18 | 39 | 67 | 2 |
| * | JFK | LAX | 737 | Sat. | 0:00 | 23:59 | 1 | 5 | 10 | 15 | 3 |
| * | JFK | LAX | 737 | * | 6:00 | 14:00 | 7 | 22 | 46 | 70 | 4 |

1102 — row 1
1104 — row 2
1106 — row 3
1108 — row 4

| Flight # | Departure Airport | Arrival Airport | Aircraft Type | Day of Week | Departure Time Start Range | Departure Time End Range | 80% | 90% | 95% | 97% | K |
|---|---|---|---|---|---|---|---|---|---|---|---|
| 111 | JFK | LAX | 737 | W | 6:00 | 8:00 | 5 | 17 | 38 | 69 | 1 |
| 111 | JFK | LAX | 737 | Sat. | 6:00 | 8:00 | 1 | 5 | 10 | 15 | 2 |
| 111 | JFK | LAX | 737 | Sun. | 6:00 | 8:00 | 1 | 5 | 10 | 15 | 3 |
| 111 | JFK | LAX | 737 | * | 6:00 | 8:00 | 3 | 14 | 34 | 63 | 4 |
| 222 | JFK | LAX | 737 | W | 11:00 | 13:00 | 7 | 22 | 46 | 70 | 5 |
| 222 | JFK | LAX | 737 | * | 11:00 | 13:00 | 5 | 18 | 39 | 67 | 6 |
| 333 | JFK | LAX | 737 | Sat. | 15:00 | 16:00 | 1 | 3 | 9 | 14 | 7 |
| 333 | JFK | LAX | 737 | Sun. | 15:00 | 16:00 | 1 | 3 | 8 | 15 | 8 |

FIG. 11B ially, to preparing schedules of tasks for personnel based on a likelihood that the schedules of tasks will not exceed a personal limit of a person assigned to the itinerary and/or based on priority ranking for the tasks.

DUTY BLOCK TIME CONTROL VIA STATISTICAL ANALYSIS

CROSS-REFERENCE TO RELATED APPLICATIONS

This application is a continuation-in-part of co-pending U.S. patent application Ser. No. 14/500,400, filed Sep. 29, 2014 and a continuation-in-part of co-pending U.S. patent application Ser. No. 14/500,447 filed Sep. 29, 2014. The aforementioned related patent applications are herein incorporated by reference in their entirety.

FIELD

Aspects described herein relate to personnel scheduling, and more specifically, to preparing schedules of tasks for personnel based on a likelihood that the schedules of tasks will not exceed a personal limit of a person assigned to the itinerary and/or based on priority ranking for the tasks.

SUMMARY

According to various aspects, a method for assigning various operations to an itinerary includes determining Gumbel distributions for time variances of the various operations based on time variances during past instances of the various operations. The time variances are variances from scheduled times for the various operations. The method also includes selecting a reliability factor. The method also includes determining time variances for the various operations, based on the determined Gumbel distributions and selected reliability factors for the various operations. The method also includes identifying a combination of operations from among the various operations wherein a sum of scheduled times for the combination of operations and the determined time variances for the combination of operations do not exceed a personal time limit of personnel. The method also includes assigning the identified combination of operations to an itinerary.

According to various aspects, a system includes memory storing past instances of various operations. The system also includes a processor configured to receive a selection of a reliability factor. The processor is also configured to analyze the past instances of various operations to determine Gumbel distributions for time variances of the various operations based on time variances during past instances of the various operations, wherein the time variances are variances from scheduled times for the various operations. The processor is also configured to determine time variances for the various operations, based on the determined Gumbel distributions and selected reliability factors for the various operations. The processor is also configured to identify a combination of operations from among the various operations wherein a sum of scheduled times for the combination of operations and the determined time variances for the combination of operations do not exceed a personal time limit of personnel. The processor is also configured to assign the identified combination of operations to an itinerary.

According to various aspects, a computer program product for assigning personnel to various operations includes a computer-readable storage medium having computer-readable program code embodied therewith. The computer-readable program code executable by one or more computer processors to receive a selection of a reliability factor. The computer-readable program code is further executable to analyze past instances of the various operations to determine Gumbel distributions for time variances of the various operations based on time variances during past instances of the various operations, wherein the time variances are variances from scheduled times for the various operations. The computer-readable program code is further executable to determine time variances for the various operations, based on the determined Gumbel distributions and selected reliability factors for the various operations. The computer-readable program code is further executable to identify a combination of operations from among the various operations wherein a sum of scheduled times for the combination of operations and the determined time variances for the combination of operations do not exceed a personal time limit of personnel. The computer-readable program code is further executable to assign the identified combination of operations to an itinerary.

BRIEF DESCRIPTION OF THE SEVERAL VIEWS OF THE DRAWINGS

FIG. 2A is an exemplary data table for past instances of a flight segment illustrating a method for determining reliability factors for operating time variances, wherein the operating time variance is an arrival time variance;

FIG. 2B is an exemplary data table for past instances of a flight segment illustrating a method for determining reliability factors for operating time variances, wherein the operating time variance is a block time variance;

FIG. 5A is an exemplary data table that illustrates a method for assigning a priority to different flight segments;

FIG. 5B is an exemplary table that illustrates acceptable reliability factors or risk levels associated with different priorities;

FIG. 10 is an exemplary table illustrating different flight segments and buffers based on Gumbel distributions for the different flight segments for different confidence intervals;

FIG. 11A is an exemplary table illustrating certain flight segments that are aggregated together according to various aspects;

FIG. 11B is an exemplary table illustrating certain flight segments that are aggregated together according to various aspects.

DETAILED DESCRIPTION

In various industries, assigning personnel (e.g., employees) to tasks or jobs can be limited by personal limits for the personnel. For example, commercial airline pilots have several different personal limits related to the length of time they can be on duty that can limit how the pilots can be assigned to different flight segments.

Figure 1A:
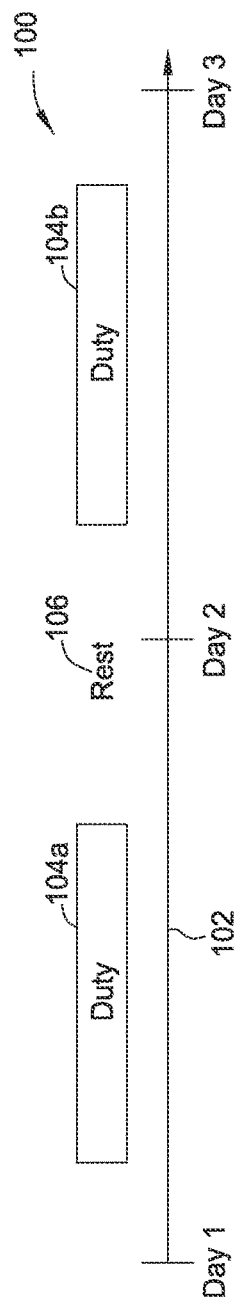
FIG. 1A is a block diagram illustrating an exemplary duty schedule for a pilot over a two-day period.

FIG. 1A illustrates a two-day timeline 102 of an exemplary duty scenario 100 for a pilot of commercial aircraft. In the scenario 100, the pilot has a first duty period 104a during a first day and a second duty period 104b during a second day. The first duty period 104a and the second duty period 104b are separated by a rest period 106. Government regulations (e.g., Federal Aviation Administration regulations), airline regulations, union rules, and the like may dictate personal limits for how long the duty periods 104a and 104b can be and may also dictate how long the rest period 106 between the two duty periods 104a and 104b needs to be.

Figure 1B:
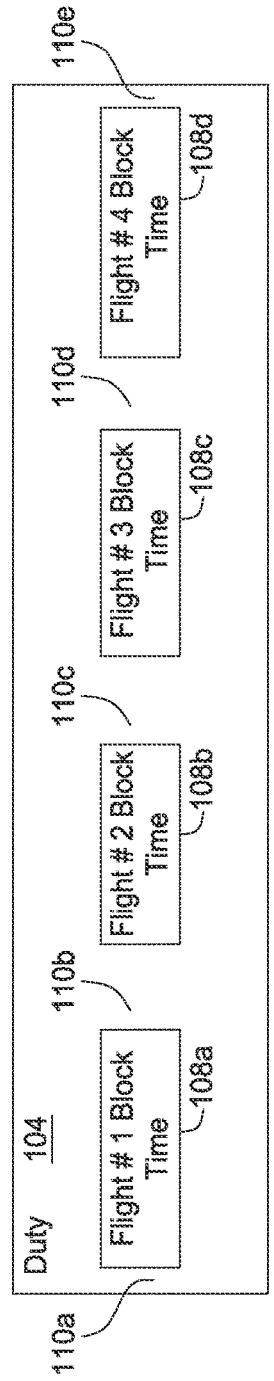
FIG. 1B is a block diagram illustrating an exemplary duty period for a pilot in which the pilot is scheduled to perform four flight segments during the duty period.

FIG. 1B provides a more detailed view of an exemplary duty period 104 for a pilot. In the exemplary duty period 104, the pilot has been assigned to an itinerary of four flight segments 108a, 108b, 108c, and 108d (collectively, flight segments 108). Each of the flight segments 108 defines a block time, which is an elapsed time from when an aircraft is pushed back from a gate at a departure airport to when the aircraft stops at a gate at an arrival airport. Again, government regulations, airline regulations, union rules, and the like can dictate personal limits for how much block time a pilot can accumulate during a duty period 104 and how long the pilot can be on duty.

As shown in FIG. 1B, the duty period 104 can begin at an earlier time than the first flight segment 108a. As an illustration, a pilot may begin his duty period 104 when he arrives at the airport at 6:00 AM. However, the pilot's first flight segment may not depart the gate until 6:45 AM. In such an instance, a time gap 110a of forty five minutes exists between the beginning of the pilot's duty period 104 and the beginning of the block time for the first flight segment 108a. Similarly, the pilot may need time between flight segments to travel from a first aircraft to a second aircraft, review the flight plan for the next flight segment, etc. Thus, time gaps 110b, 110c, and 110d are inserted between flight segments 108 to allow for such pilot transitions. The length of the time gaps 110b, 110c, and 110d that may be needed for pilots to transition can vary depending on the airport, time of day, time of year, etc. For example, at a large, busy airport such as O'Hare International Airport in Chicago Ill., a pilot may need an hour or more to transition from a first aircraft after flying a first flight segment to a second aircraft for a second flight segment. At a smaller, less-congested airport, a pilot may only need a half-hour to transition from a first aircraft after flying a first flight segment to a second aircraft for a second flight segment. As another example, on a weekday morning when airports are busy, a pilot may need more time to transition from a first flight segment to a second flight segment than may be needed on a weekend afternoon when the airport may be less crowded.

Figure 1C:
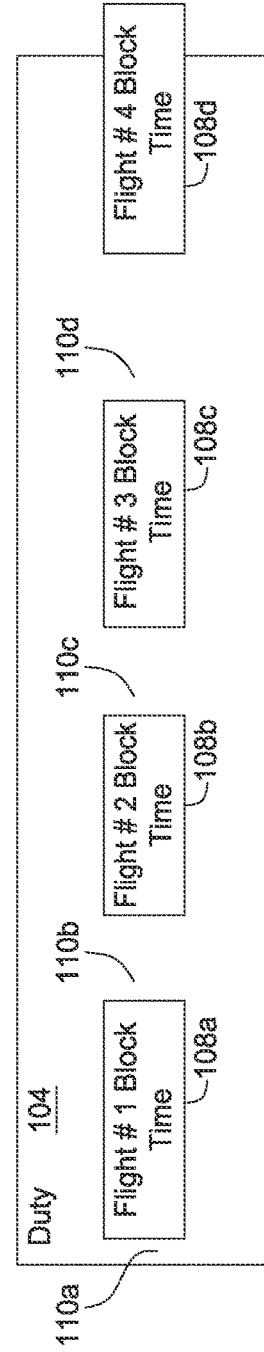
FIG. 1C is a block diagram illustrating an exemplary duty period for a pilot in which the pilot is scheduled to perform four flight segments, but the fourth flight segment would exceed the pilot's duty period.

Ideally, a pilot's duty period 104 includes a time gap 110e between the end of his last flight segment 108d and the end of the duty period 104. Such a time gap 110e can ensure that the pilot does not exceed his total duty time on the last flight segment. FIG. 1C illustrates an exemplary duty period 104 for a pilot in which the last flight segment 108d is delayed in departing. As a result, if the pilot performed the fourth flight segment, he would exceed his allowable duty time. For example, referring again to FIG. 1C, if the fourth flight segment 108d is delayed such that the aircraft will not arrive at the gate before the pilot's duty period 104 ends, then the pilot cannot fly the flight segment 108d, and a different pilot has to perform the flight segment. By contrast, if the fourth flight segment 108d takes off on time (as shown in FIG. 1B) but is delayed in the air (e.g., by weather) such that the aircraft does not arrive at the gate until after the pilots duty period 104 ends, such an inadvertent overage of the pilot's personal limits is permissible.

An operation can have one or more personnel time limit criteria associated with it. Continuing the examples above, a flight segment may have several personnel time limit criteria, such as personnel time limit criteria related to block time, arrival time, and connection time. The personnel time limits may be different based on a priority of an operation. Continuing the examples above, a particular flight segment may have a block time of two hours and thirty minutes. A personnel time limit criterion related to block time can be set to two hours and thirty minutes. If the flight becomes a high priority flight segment, then the personnel time limit criterion related to block time may be increased to three hours.

To avoid exceeding the personal limits of pilots, airlines can employ buffers to account for operating variances. For example, airlines may add an hour of extra block time to a duty period when scheduling the crew to decrease the likelihood that the crew will actually exceed their personal limits. Similarly, an airline may require a minimum connection time (by adding a connection time buffer between flight segments) of an hour and a half regardless of the airport, the time of day, the time of year, or the like. These buffers are often set to a conservative number that will capture most flight operations. However, a significant number of flight operations do not require such large buffers. As a result, significant amounts of crew time can be wasted by these buffers. For example, if the pilot is only allowed eight hours of block time during any given duty period 104, then an hour of block time buffer only allows the pilot to be scheduled to fly seven actual block hours.

For commercial airline operations, a flight segment may be defined as an operation scheduled to depart a first airport at a specific time of day (and possibly a day of the week) and arrive at a second airport at a second specific time of day. For example, an airline may operate hourly flight segments between LaGuardia Airport in New York City and Reagan national Airport in Washington D.C. The flight segment leaving LaGuardia at 7 AM each day is considered a first flight segment, a flight segment leaving LaGuardia at 8 AM each day is considered a second flight segment, etc. Often, an airline will use the same numerical indicator (e.g., Oceanic 1140 or Oceanic 3288) for the same flight segment on each day. However, airlines sometimes treat weekend flight segments differently than weekday flight segments because airlines may fly different schedules on the weekends and/or air traffic congestion may be reduced. For example, a flight segment from LaGuardia to Reagan National may take one hour gate to gate during the week due to air traffic and the like. However, the same flight segment may only take fifty minutes on the weekend.

Aspects described herein analyze historical data for different flight segments to determine the likelihood of various flight operation variances. These flight operation variances can be used to add buffers that are flight segment specific. These flight segment specific buffers can be more accurate than generally-applied buffers, meaning that such a buffer applied to a specific flight segment can be an accurate representation of actual variations from scheduled operation. FIGS. 2A and 2B illustrate exemplary data for a month that may be used to analyze flight operation variances for a particular flight segment. FIG. 2A illustrates a data table 200 for a particular flight segment that is scheduled to arrive at a destination airport at 11:50 AM (denoted as 1150 in column 206 of the data table 200), wherein a first column 202 indicates the thirty days in the particular month. A second column 204 indicates the day of the week associated with each of the thirty days of the month. The third column 206 indicates the actual arrival time of the flight segment on each of the thirty days of the month. For example, on the first day of the month, the flight segment arrived at 11:49 AM; one minute early. On the second day of the month, the flight segment arrived at 11:41 AM; nine minutes early. On the third day of the month, the flight segment arrived at 11:50 AM; on time. On the fourth day of the month, the flight segment arrived at 11:58 AM; eight minutes late. The fifth column 210 of the data table 200 provides a ranking of the nine most-delayed operations of the flight segment over the course of the month. For example, the flight segment on the twelfth day (in row 218) arrived at 12:25 PM, which is 35 minutes late. This flight segment was the most delayed over the course of the month and is therefore ranked number one in the rank column 210. The flight segment on the eleventh day (in row 220) arrived at 12:20 PM, which is 30 minutes late. This flight segment was the second most-delayed flight segment over the course of the month and is therefore ranked number two in the rank column 210. Similarly, the flight segment on the ninth day of the month (row 222) was the third-most delayed flight segment of the month, the flight segment on the nineteenth day of the month (row 224) was the fourth-most delayed flight segment of the month, the flight segment on the fourth day of the month (row 226) was the fifth-most delayed flight segment of the month, the flight segment on the twenty-fifth day of the month (row 228) was the sixth-most delayed flight segment of the month, the flight segment on the twenty-third day of the month (row 230) was the seventh-most delayed flight segment of the month, the flight segment on the eighth day of the month (row 232) was the eighth-most delayed flight segment of the month, and the flight segment on the twenty-second day of the month (row 234) was the ninth-most delayed flight segment of the month. These flight segments are ranked three, four, five, six, seven, eight, and nine, respectively, in column 210.

With rankings determined, likelihoods of the flight segment arriving late (e.g., a predicted arrival time or predicted arrival time variance) can be determined. Using the exemplary thirty flight segments shown in FIG. 2A, a flight segment on a particular day represents approximately 3% of the total flight segments. As discussed above, in this example, the worst flight segment of the month on the twelfth day (row 218) arrived 35 minutes late. Thus, 97% of the flight segments during the month arrived no more than 34 minutes late. If an airline wants to establish a buffer for the arrival time for this particular flight segment that has a 97% reliability factor, then the airline could establish a buffer of 34 minutes. Alternatively, if the airline wants to establish a buffer for the arrival time for this particular flight segment that has a 97% reliability factor, then the airline could establish a buffer of 30 minutes (equal to the next longest flight) or any time between 30 minutes and 34 minutes. Continuing the example, the second worst flight segment of the month on the eleventh day (row 220) arrived 30 minutes late and the third worst flight segment of the month on the ninth day (row 222) arrived 20 minutes late. The first, second, and third worst flight segments together represent approximately 10% of the total flight segments for the month. Thus, 90% of the flight segments during the month arrived no more than 19 minutes late. If an airline wants to establish a buffer for the arrival time for this particular flight segment that has a 90% reliability factor, the airline could establish a buffer of 19 minutes. Continuing the example again, the fourth worst flight segment of the month on the nineteenth day (row 224) arrived 18 minutes late, the fifth worst flight segment of the month on the fourth day of the month (row 226) arrived eight minutes late, and the sixth worst flight segment of the month on the twenty-fifth day (row 228) arrived six minutes late. The first through sixth worst flight segments together represent approximately 20% of the total flight segments for the month. Thus, 80% of the flight segments during the month arrived no more than five minutes late. If an airline wants to establish a buffer for the arrival time for this particular flight segment that has an 80% reliability factor, the airline could establish a buffer time of five minutes.

FIG. 2B illustrates a data table 250 for a particular flight segment that is scheduled to have a block time of two hours and thirty minutes (denoted as 2:30 in column 256 of the table 250), wherein a first column 252 indicates the thirty days in a particular month. A second column 254 indicates the day of the week associated with each of the thirty days of the month. The third column 256 indicates the actual block time of the flight segment on each of the thirty days of the month. For example, on the first day of the month, the block time was two hours and twenty nine minutes; one minute short. On the second day of the month, the block time was two hours and twenty one minutes; nine minutes short. On the third day of the month, the block time was two hours and thirty minutes; on time. On the fourth day of the month, the block time was two hours and thirty eight minutes; eight minutes long. The fifth column 260 of the table 250 provides a ranking of the nine longest block times for the flight segment over the course of the month. For example, the block time for the flight segment on the twelfth day (in row 268) was three hours and five minutes, which is 35 minutes long (relative to the scheduled two hours and thirty minutes). This flight segment was the longest over the course of the month and is therefore ranked number one in the rank column 260. The block time for the flight segment on the eleventh day (in row 270) was three hours, which is thirty minutes long. This flight segment was the second longest over the course of the month and is therefore ranked number two in the rank column 260. Similarly, the block time for the flight segment on the ninth day of the month (row 272) was the third longest of the month, the block time for the flight segment on the nineteenth day of the month (row 274) was the fourth longest of the month, the block time for the flight segment on the fourth day of the month (row 276) was the fifth longest of the month, the block time for the flight segment on the twenty-fifth day of the month (row 278) was the sixth longest of the month, the block time for the flight segment on the twenty-third day of the month (row 280) was the seventh longest of the month, the block time for the flight segment on the eighth day of the month (row 282) was the eighth longest of the month, and the block time for the flight segment on the twenty-second day of the month (row 284) was the ninth longest of the month. These flight segments are ranked three, four, five, six, seven, eight, and nine, respectively, in column 260.

With rankings determined, likelihoods of the block time for the flight segment being longer than scheduled (i.e., a predicted block time variance) can be determined. Using the exemplary thirty flight segments shown in FIG. 2B, a flight segment on a particular day represents approximately 3% of the total flight segments. As discussed above, in this example, the block time for the worst flight segment of the month on the twelfth day (row 268) was 35 minutes longer than scheduled. Thus, the block time for 97% of the flight segments during the month was no more than 34 minutes long. If an airline wants to establish a buffer for the block time for this particular flight segment that has a 97% reliability factor, then the airline could set a buffer of 34 minutes. Alternatively, if the airline wants to establish a buffer for the block time for this particular flight segment that has a 97% reliability factor, then the airline could establish a buffer of 30 minutes (equal to the next longest flight) or any time between 30 minutes and 34 minutes. Continuing the example, the block time for the second worst flight segment of the month on the eleventh day (row 220) was 30 minutes longer than scheduled and the block time for the third worst flight segment of the month on the ninth day (row 222) was 20 minutes longer than scheduled. The first, second, and third worst flight segments together represent approximately 10% of the total flight segments for the month. Thus, the block time for 90% of the flight segments during the month was no more than 19 minutes longer than scheduled. If an airline wants to establish a buffer for the block time for this particular flight segment that has a 90% reliability factor, the airline could set a buffer of 19 minutes. Continuing the example again, the block time for the fourth worst flight segment of the month on the nineteenth day (row 224) was 18 minutes longer than scheduled, the block time for the fifth worst flight segment of the month on the fourth day of the month (row 226) was eight minutes longer than scheduled, and the block time for the sixth worst flight segment of the month on the twenty-fifth day (row 228) was six minutes longer than scheduled. The first through sixth worst flight segments together represent approximately 20% of the total flight segments for the month. Thus, the block time for 80% of the flight segments during the month was no more than five minutes longer than scheduled. If an airline wants to establish a buffer for the block time for this particular flight segment that has an 80% reliability factor, the airline could set a buffer time of five minutes.

The tables in FIGS. 2A and 2B are provided for illustration purposes. In various instances, larger data sets could be used to provide more robust analyses. For example, if the data set includes 100 flight segments, then a flight segment on a particular day represents 1% of the total flight segments, and the airline may be able to select buffers with 99% reliability factors. As another example, if the data set includes 1000 flight segments, then 10 flight segments represents 1% of the total flight segments. Here, the airline could select buffers with 99.9% reliability factors. Additionally, larger data sets may reveal outlier instances more readily. For example, referring again to FIG. 2A, the flight segments on the twelfth the day of the month (row 218) arrived 35 minutes late. Based on the data shown in FIG. 2A, 3% of the flight segments would be expected to arrive 35 minutes late. As described above, a buffer of thirty four minutes can be set with a 97% reliability factor. However that data point on the twelfth day may be an outlier such that if 1000 flight segments are looked at, only two or three flight segments are 35 minutes late in such an instance, the 34 minutes buffer would not represent a 97% reliability factor. Rather, the 34 minute buffer would represent a greater than 99% reliability factor.

Additional likelihoods can be determined in a similar manner to arrival time and block time as explained above with reference to FIGS. 2A and 2B.

The data in the data tables 200 and 250 in FIGS. 2A and 2B, respectively, can also be parsed and analyzed based on additional factors. For example, as discussed above, commercial flight segments generally do not experience the same delays on weekends that may be experienced during weekdays because there are generally fewer flight segments on weekends. Thus, the type of data shown in the data tables 200 and 250 can be split into weekday flight segments and weekend flight segments, and separate analyses can be performed on the different sets of data, for example. The type of data shown in the data tables 200 and 250 could also be split by day of the week, and separate analyses can be performed on the different sets of data.

In various aspects, the data or reliability factors can be represented by tags. For example, a tag may include a combination of a letter and a number. The letter can represent a magnitude of a variance and the number can represent a likelihood of the variance for a particular flight segment. For example, for an arrival delay (a variance from the scheduled arrival time), the letter "A" may represent a delay of five minutes or less. The letter "B" may represent a delay of fifteen minutes or less. The letter "C" may represent a delay of thirty minutes or less. The letter "D" may represent a delay of an hour or less. The letter "E" may represent a delay of two hours or less. The letter "F" may represent a delay of greater than two hours. Furthermore, the number "1" may represent a 99% likelihood that the associated delay is not exceeded. The number "2" may represent a 97% likelihood that the associated delay is not exceeded. The number "3" may represent a 95% likelihood that the associated delay is not exceeded. The number "4" may represent a 90% likelihood that the associated delay is not exceeded. The number "5" may represent an 85% likelihood that the associated delay is not exceeded. The number "6" may represent an 80% likelihood that the associated delay is not exceeded. Thus, for example, a particular flight segment may include the tag "B3," which would mean that the flight segment is delayed by fifteen minutes or less 95% of the time. Another flight segment may include the tag "B4," which would mean that the flight segment is delayed by fifteen minutes or less 90% of the time. A flight segment may include more than one tag. For example, a flight segment may include a first tag "A6" and a second tag "B4," meaning that the flight segment is delayed five minutes or less 80% of the time and is delayed by fifteen minutes or less 90% of the time. The flight segment may have other tags related to different operating variances, such as block time variances.

Referring again to FIGS. 1A and 1B, when determining combinations of flight segments that can form an itinerary, aspects described herein can add the determined buffers to the various flight segments in the combination, based on an acceptable reliability factor. In various instances, the acceptable reliability factor may be the same for every flight segment operated by a particular airline. As discussed in greater detail below, in various instances, different reliability factors may be applied to different flight segments operated by an airline. For example, an airline may use a 99% reliability factor for high priority flight segments (e.g., flight segments that are important to customers, flight segments that generate high revenues, flight segments that are strategically important, and/or flight segments that return an aircraft to a maintenance facility), and buffers for the high priority flight segment can be automatically set based on the analysis, described above, and the 99% reliability factor. As another example an airline may use a 97% reliability factor for medium priority flight segments, and buffers for the medium priority flight segment can be automatically set based on the analysis, described above, and the 97% reliability factor. As another example, an airline may use a 95% reliability factor for low priority flight segments, and buffers for the low priority flight segment can be automatically set based on the analysis, described above, and the 95% reliability factor. In the event that a combination of flight segments (with the determined buffers applied) would exceed a personal duty time limit for a pilot, then the combination of flight segments would be rejected (i.e., an itinerary would not be formed from that combination). For example, referring to FIG. 1B, if a possible combination of flight segments has a pilot flying four flight segments 108a, 108b, 108c, and 108d, and the predicted block time for the combination of flight segments (when the buffers for the flight segments are included) would exceed a pilot's total block time, then the combination is not workable. As a result, the combination would not be assigned to an itinerary. Instead, the combination could be changed to include a different flight segment that has a shorter block time than flight segment 108d. Alternatively, the combination could be changed to include different earlier flight segments so that the combination can include flight segment 108d.

Figure 3:
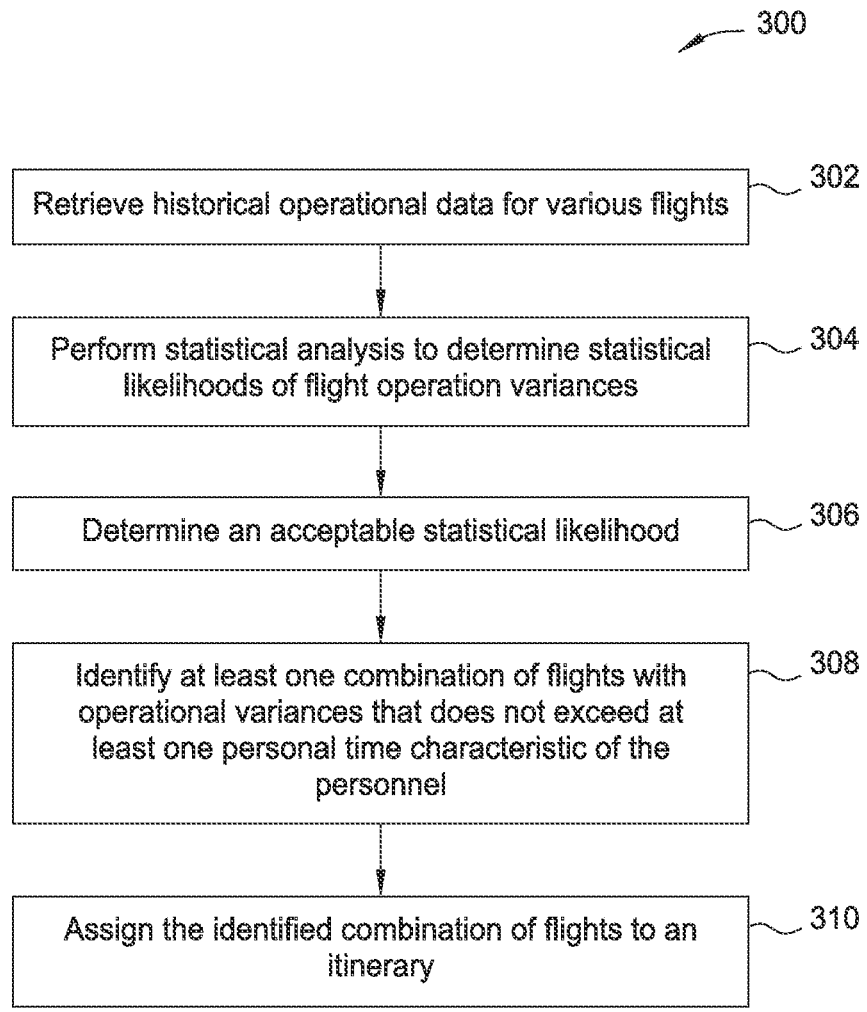
FIG. 3 is a block diagram of a method for assigning future instances of flight segments to crew itineraries.

FIG. 3 illustrates a method 300 that aspects described herein can use to assign combinations of flight segments to itineraries. In block 302 of the method 300, historical operational data for the various flight segments can be retrieved. For example, historical operational data, such as the type of data shown in FIGS. 2A and 2B, for flight segment 108d (in FIG. 1B) may be retrieved. In block 304 of the method 300, an analysis on the retrieved data can be performed to determine the likelihood's of various flight operation variances. For example, the analysis may determine the likelihood that the flight segment 108d arrives five minutes late, the likelihood that the flight segment 108d arrives 10 minutes late, etc. As discussed, one or more tags can be applied to the analysis for flight segment 108d as a result of the analysis. As another example, the analysis may determine the likelihood that the block time for the flight segment 108d is five minutes longer than scheduled, the likelihood that the block time for the flight segment 108d is 10 minutes longer than scheduled, etc. Again, one or more tags can be applied to the analysis for flight segment 108d. In block 306 of the method 300, an acceptable likelihood (i.e., reliability factor) can be determined. As described above, in various aspects, a single reliability factor can be applied to all operation variances for all flight segments. In various other aspects, different reliability factors can be applied to different flight segments and/or to different operation variances. For example, a first reliability factors could be applied to an operation variances related to block time and a second reliability factors could be applied to an operation variances related to arrival time. In block 308, a combination of flight segments (with buffers having reliability factors applied) that do not exceed personal limits of pilots (e.g., block time limits and total duty time limits) is identified. In block 310, the identified combination of flight segments is assigned to an itinerary.

Other flight segments can be formed into other combinations of flight segments and assigned to itineraries in a similar manner until all of the flight segments for an airline for a particular period (e.g., a day, a week, or a month) are assigned to itineraries. Pilots can then be assigned to the various itineraries. In various instances, itineraries may not be optimized at an individual level, but the schedule of itineraries may be optimized. Put differently, an individual pilot's itinerary may not be optimized (e.g., it may not utilize as much of his block time as possible), but the itineraries may provide an overall optimized schedule for the airline's operations.

Aspects of systems and/or computer program products that perform the method 300 of FIG. 3 may provide a user interface that enables a user (e.g., a crew scheduler) to select the reliability factors for different flight segments or groups of flight segments (e.g., high priority flight segments, medium priority flight segments, and low priority flight segments). The setting of buffers for the flight segments based on the analysis and selected reliability factors may be invisible to the user. Put differently, the user may select a reliability factor for a flight segment (or group of flight segments), and the system and/or computer program would update and output relevant times for the flight segment (e.g., block time and arrival time) based on the analysis of past instances of the flight segment and the selected reliability factor.

In various instances, any combination of flight segments can be assigned to any itinerary. Continuing the example above, a first possible combination of flight segments could be predicted to leave a pilot with two hours and fifty-five minutes of available block time by the time he would fly flight segment 108d. A second possible combination of flight segments could be predicted to leave a pilot with three hours of available block time by the time he would fly flight segment 108d. Flight segment 108d could be included in either the first possible combination or the second possible combination. However, the additional available block time in the second combination of flight segments provides an extra buffer compared to the first combination of flight segments. For example, if an earlier flight segment in the first and second combinations has a block time of ten minutes longer than expected (even with a buffer applied), then the first combination only leaves the pilot with two hours and forty five minutes of block time available for flight segment 108d—less than the two hours and forty-nine minutes with the reliability factor described above. By contrast, the second combination of flight segments would have still leave the pilot with two hours and fifty minutes of available block time—still more than the two hours and forty-nine minutes. In such an exemplary instance, assigning flight segment 108d to the second combination of flight segments can be a less-risky option than assigning flight segment 108d to the first combination. For an airline that may operate hundreds or thousands of flight segments every day at different times and from different airports, it is likely that some flight segments will have a riskier crew scheduling than others. As described in greater detail below, if an airline can identify a certain subset of flight segments that are considered to be high priority, then the least risky crew assignments can be assigned to those flight segments. Similarly, the most risky crew assignments (e.g., crew assignments that are more at risk of causing a flight delay or cancellation due to the flight segment exceeding personal limits of the pilot(s)) can be assigned to low priority flight segments.

Figure 4:
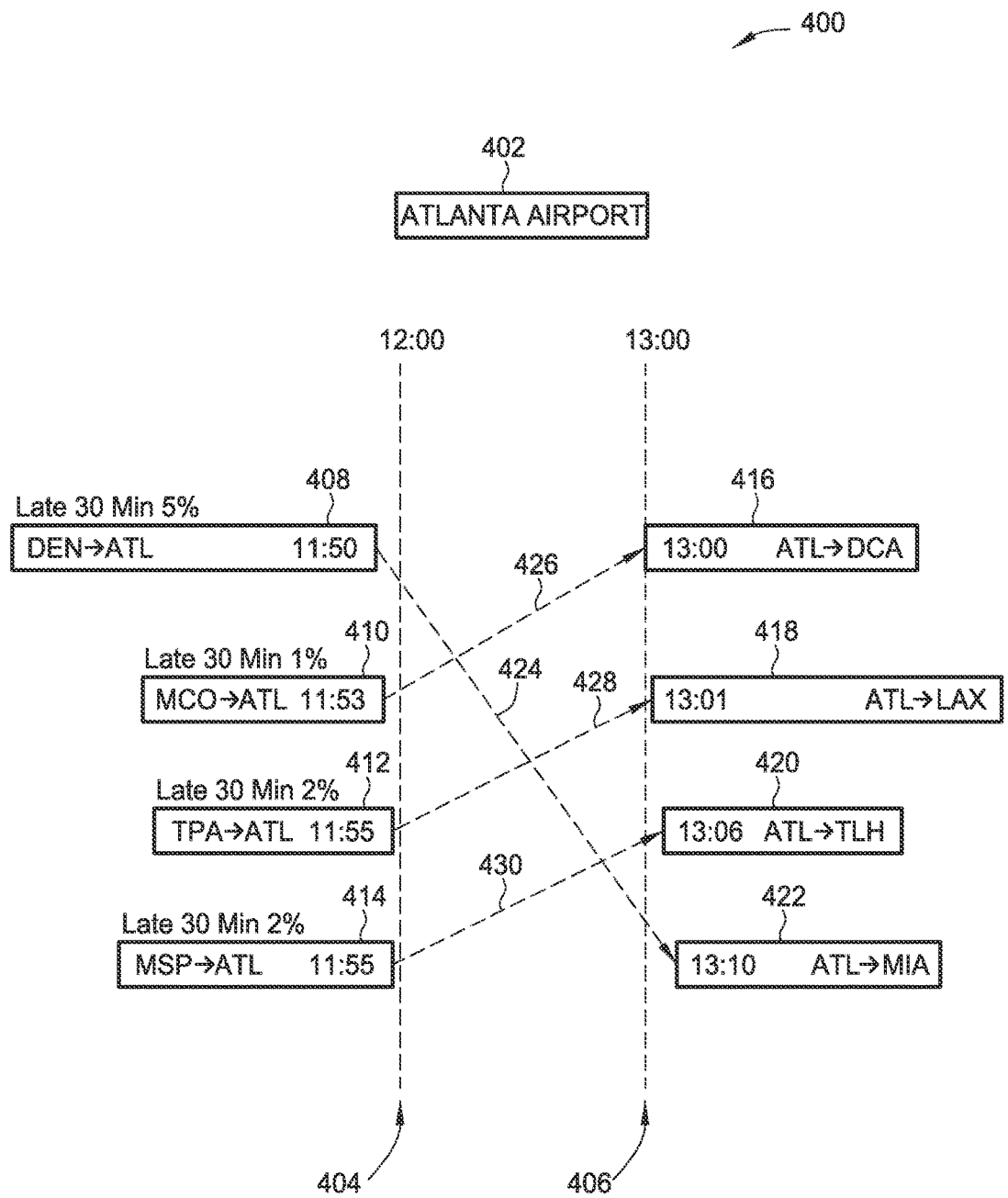
FIG. 4 is a block diagram illustrating flight crews of inbound flight segments being assigned to outbound flight segments based on a "first in first out" process.

FIG. 4 illustrates a timeline for an exemplary scenario 400 in which four flight segments 408, 410, 412, and 414 are arriving at Hartsfield International Airport in Atlanta 402 shortly before noon (represented by dashed line 404) and four flight segments 416, 418, 420, and 422 are leaving Atlanta 402 little after 1:00 PM (represented by dashed line 406). For the purposes of illustration, in this scenario 400, the possible combinations of flight segments for the flight crews for the four incoming flight segments 408, 410, 412, and 414 include assignments to one of the four outgoing flight segments 416, 418, 420, and 422. In this scenario 400, the priorities of the four outgoing flight segments 416, 418, 420, and 422 are not known. As a result, the crews from the inbound flight segments could be assigned to the outbound flight segments based on a modified first in first out basis. The first pilots into Atlanta 402 are assigned to the first flight segment out of Atlanta, except a few modifications are made based on flight segments that are more likely to be substantially delayed. For example, flight segment 408 is scheduled to arrive in Atlanta first at 11:50 AM. However, the flight segment 408 is historically late by 30 minutes or more 5% of the time. The remaining flight segments 410, 412, and 414 arrive later but are only 30 minutes late 1% or 2% of the time. Thus, even though flight segment 408 is scheduled to arrive first, for scheduling purposes its crew is treated as if they arrive last due to the significantly more likely possibility that flight segment 408 will arrive at least 30 minutes late. Otherwise, the combination of flight segments for the crew of flight segment 410, which is scheduled to arrive in Atlanta 402 at 11:53 AM, next includes flight segment 416 (as denoted by dashed arrow 426), which departs Atlanta 402 at 1:00 PM. Similarly, the combination of flight segments for the crew of flight segment 412, which is scheduled to arrive in Atlanta 402 at 11:55 AM, next includes flight segment 418 (as denoted by dashed arrow 428), which departs Atlanta 402 at 1:01 PM. Also, the combination of flight segments for the crew of flight segment 414, which is scheduled to arrive in Atlanta 402 at 11:55 AM, next includes flight segment 420 (as denoted by dashed arrow 430), which departs Atlanta 402 at 1:06 PM. Finally, the combination of flight segments for the crew of flight segment 408, which is scheduled to arrive in Atlanta 402 at 11:50 AM (but which has a significantly higher likelihood of being late by 30 minutes or more), next includes flight segment 422 (as denoted by dashed arrow 424), which departs Atlanta 402 at 1:10 PM.

The above-described assignment of flight crews to various aircraft in Atlanta 402 may result in a relatively even distribution of schedule risk for the four departing flight segments 416, 418, 420, and 422. However, if one of the departing flight segments is of a higher priority than the others it may be advantageous to rearrange the crew assignments so that the highest priority flight segment has less scheduling risk.

FIG. 5A illustrates a table 500 with exemplary data that is used to assign priorities to different flight segments. A first column 502 of the table 500 identifies ten flight segment numbers. Although these flight segment numbers are illustrated herein as the numbers 1 through 10, the numbers could correspond to flight segment numbers used by an airline. Columns 504 and 506 of the table 500 identify the departure airport and arrival airport, respectively, for the flight segments. Columns 508 through 514 of the table 500 identify various different exemplary priority rankings for the flight segments that can be used to determine an overall priority ranking (in column 516). Column 508 identifies a market value (e.g., revenue) for the flight segments. Column 510 identifies a financial ranking for the flight segments (on a scale of 1 to 5 where 1 is a high ranking and 5 is a low ranking) In various instances, the financial ranking may be correlated to or otherwise associated with the market value in column 510. For example, flight segment number two and flight segment number eight have a market value (in column 508) of $110,000 and a corresponding financial ranking of 1. By contrast flight segment number four has a market value of $20,000 and a corresponding financial ranking of 5. In various instances, the financial rankings may not correlate or otherwise correspond to the market values. In such instances, the financial rankings may be entered or modified (e.g., by a system administrator) to reflect a "subjective" financial ranking to the airline. Column 512 identifies a maintenance ranking for the flight segments (on a scale of 1 to 5 where 1 is high ranking and 5 is low ranking) Airlines often maintain maintenance facilities at certain airports that they fly to or from. The flight segments flying to those airports may be high priority for maintenance reasons (e.g., if an aircraft is due for maintenance, service, or an inspection). For example, flight segment 7 in the table 500 is scheduled to arrive at Denver international Airport. In this exemplary scenario, Denver may be a maintenance facility for this particular airline. Consequently, this flight segment may have a maintenance ranking of 1 (e.g., if the aircraft is due for scheduled maintenance). The remaining nine flight segments do not arrive at Denver and therefore have a maintenance ranking of 5. Column 514 identifies a strategic ranking for the flight segments (on a scale of 1 to 5 where 1 is high ranking and 5 is low ranking) A flight segment may be high priority for reasons other than revenue or maintenance. For example, a particular airline may be pursuing a marketing initiative in which they advertise hourly flight segments from LaGuardia Airport in New York City to Reagan National Airport in Washington, D.C. to attract business travelers. Some of the hourly flight segments may not be particularly profitable or may even lose money. However, those flight segments would be important for the marketing efforts of the company. As another example, a particular flight segment may fly between two hub airports for an airline. Such a flight segment may be strategically high priority because the cancellation or delay of the flight segment could result in a cascade of subsequent missed connections or flight segments for passengers. By contrast, a low revenue flight segment into a small market may have low strategic priority. Additional rankings may be provided on any number of factors that an airline finds to be important. In column 516 of the table 500, an overall ranking can be calculated based on the individual rankings. For example, in the table 500, the financial ranking (in column 510), the maintenance ranking (column 512), and the strategic ranking (column 514) are averaged together to determine the overall ranking for the flight segments. Alternatively, the various rankings could be added together, averaged using a weighted average, or combined through other methods.

Referring now to FIG. 5B, different buffer reliability factors can be assigned to flight segments having different overall rankings (e.g., from the table shown 500 shown in FIG. 5A). For example, FIG. 5B illustrates a table 530 of different reliability factors for buffers for different overall rankings. The first column 532 of the table 530 includes different ranges of overall rankings. For example, overall rankings between 1 and 2.5 can be considered high priority flight segments, overall rankings between 2.6 and 3.5 can be considered medium priority flight segments, and overall rankings between 3.6 and 5 can be considered low priority flight segments. The ranges of overall ranking may be associated with different reliability factors for buffers associated with different operation variances. For example, column 534 of the table 530 identifies allowable reliability factors for block time buffers. As an example, for high-priority flight segments, a block time buffer could provide at least a 99% reliability factor. For medium priority flight segments a block time buffer could provide at least a 98% reliability factor. For low priority flight segments, a block time buffer could provide at least a 97% reliability factor. As another example, column 536 of the table 530 identifies allowable reliability factors for duty time buffers (e.g., buffers designed to prevent a crew member from exceeding total duty time limits). For example, for high-priority flight segments, a duty time buffer could provide at least a 98% reliability factor. For medium priority flight segments, a duty time buffer could provide at least a 97% reliability factor. For low priority flight segments, a duty time buffer could provide at least a 96% reliability factor. As another example, column 538 of the table 530 identifies allowable reliability factors for rest time (e.g., the amount of time a pilot could be off-duty between on duty periods). For example, for high-priority flight segments, the rest time buffer could provide at least a 99% reliability factor. For medium priority flight segments, a rest time buffer could provide at least a 98% reliability factor. For low priority flight segments, the rest time buffer could provide at least a 97% reliability factor. As another example, column 540 of the table 530 identifies allowable reliability factors for connection risk (e.g., the amount of time it takes a pilot to transfer from one aircraft at an airport to a second aircraft at the airport). For example, for high-priority flight segments, the connection buffer could provide at least a 97% reliability factor. For medium priority flight segments, a connection buffer could provide at least a 96% reliability factor. For low priority flight segments, a connection buffer could provide at least a 95% reliability factor. The exemplary reliability factors shown in table 530 are merely examples provided for illustration purposes. An airline may determine reliability factors that suit its strategy.

Personnel may have personal limits related to operation priority. For example, continuing the examples above, pilots may be limited to performing one high priority flight segment in a duty period.

Figure 6:
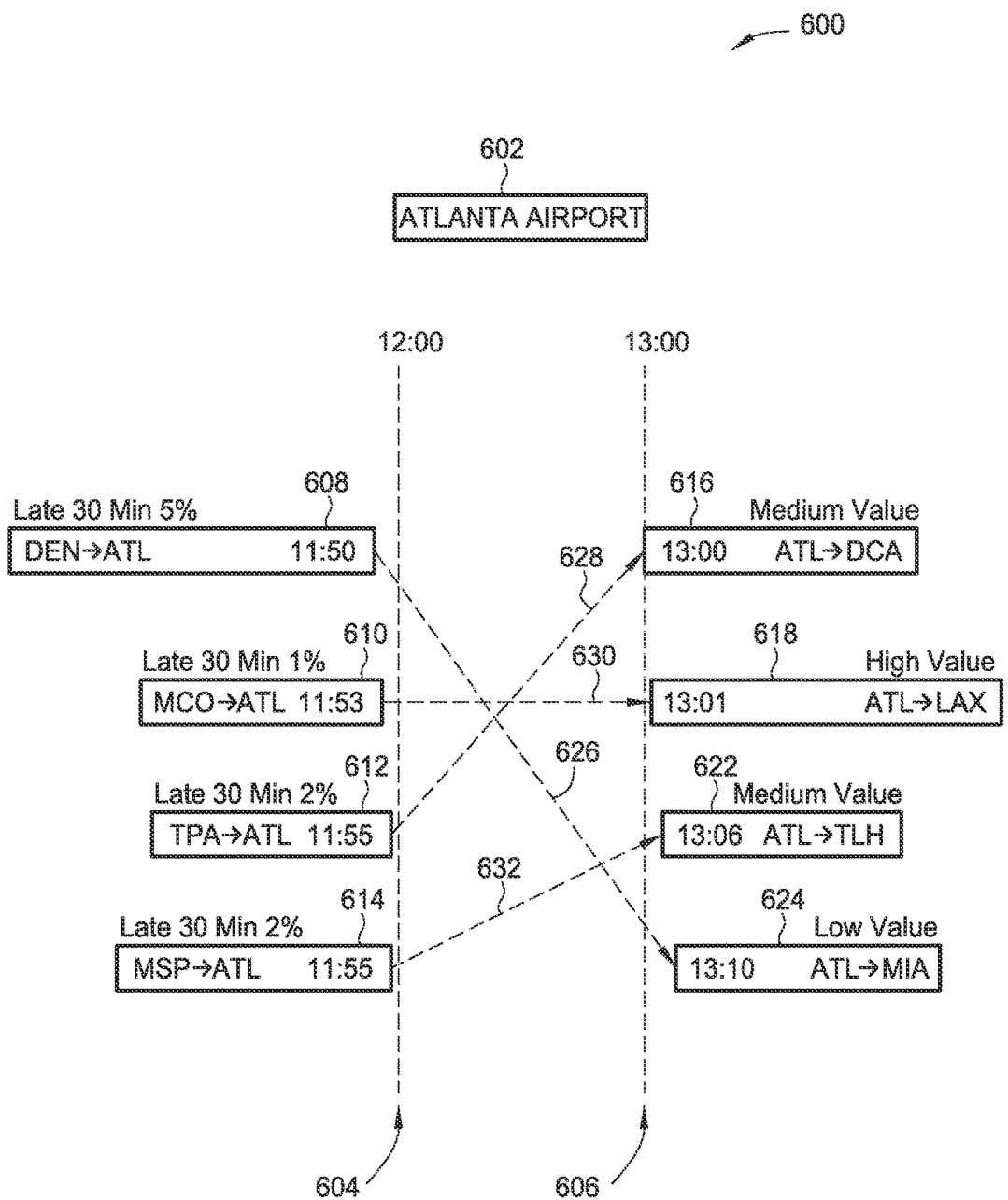
FIG. 6 is a block diagram illustrating flight crews of inbound flight segments being assigned to outbound flight segments based on a "first in to highest priority" process.

FIG. 6 illustrates a scenario 600 that is similar to the scenario 400 shown in FIG. 4, except that the combinations of flight segments for flight crews (from inbound flight segments to outbound flight segments) are based on a prioritization of the outbound flight segments. Flight segment 608 is scheduled to arrive in Atlanta at 11:50 AM, but the flight segment 608 is historically late by thirty minutes or more 5% of the time. The remaining flight segments 610, 612, and 414 arrive later but are only thirty minutes late 1% or 2% of the time. Thus, even though flight segment 608 is scheduled to arrive first, for scheduling purposes its crew is treated as if they arrive last due to the higher likelihood that flight segment 608 will arrive at least thirty minutes late. Here, outbound flight segment 618 is determined to be a high-priority flight segment. Flight segments 616 and 622 are determined to be medium priority flight segments, and flight segment 624 is determined to be a low priority flight segment. Referring again to FIG. 4, where priorities of the flight segments are not known or assigned, the combination of flight segments for the flight crew of inbound flight segment 610 next included the first outbound flight segment 416. In the scenario 600 shown in FIG. 6 however, flight segment 618 has been determined to be of higher priority than flight segment 616. Thus, the combination of flight segments that includes inbound flight segment 610 also includes flight segment 618 (as denoted by dashed arrow 630) even though flight segment 618 is scheduled to depart after flight segment 616. Consequently, the combination of flight segments that includes inbound flight segment 612 also includes outbound flight segment 616 (as denoted by dashed arrow 628). As before in the scenario 400 shown in FIG. 4, the combination of flight segments that includes inbound flight segment 614 also includes outbound flight segment 622 (as denoted by dashed arrow 632), and the combination of flight segments that includes inbound flight segment 608 also includes outbound flight segment 624 (as denoted by dashed arrow 626). With the arrangement of crew assignments shown in scenario 600, the scheduling risk for high-priority flight segment 618 has been decreased relative to the crew assignments shown in scenario 400.

Additional buffers can also be considered when assigning crews to different flight segments. For example, if the crew of flight segment 612 is likely to arrive in Atlanta with significantly more block time available than the crew of flight segment 610, then the high-priority flight segment 618 may be included in a combination of flight segments that includes flight segment 612 (instead of flight segment 610). As another example, if the crew of flight segment 614 is likely to arrive in Atlanta with a longer period of time until the end of their duty period than the crew of flight segment 610, then the high-priority flight segment 618 may be included in a combination of flight segments that includes flight segment 614 (instead of flight segment 610).

Figure 7A:
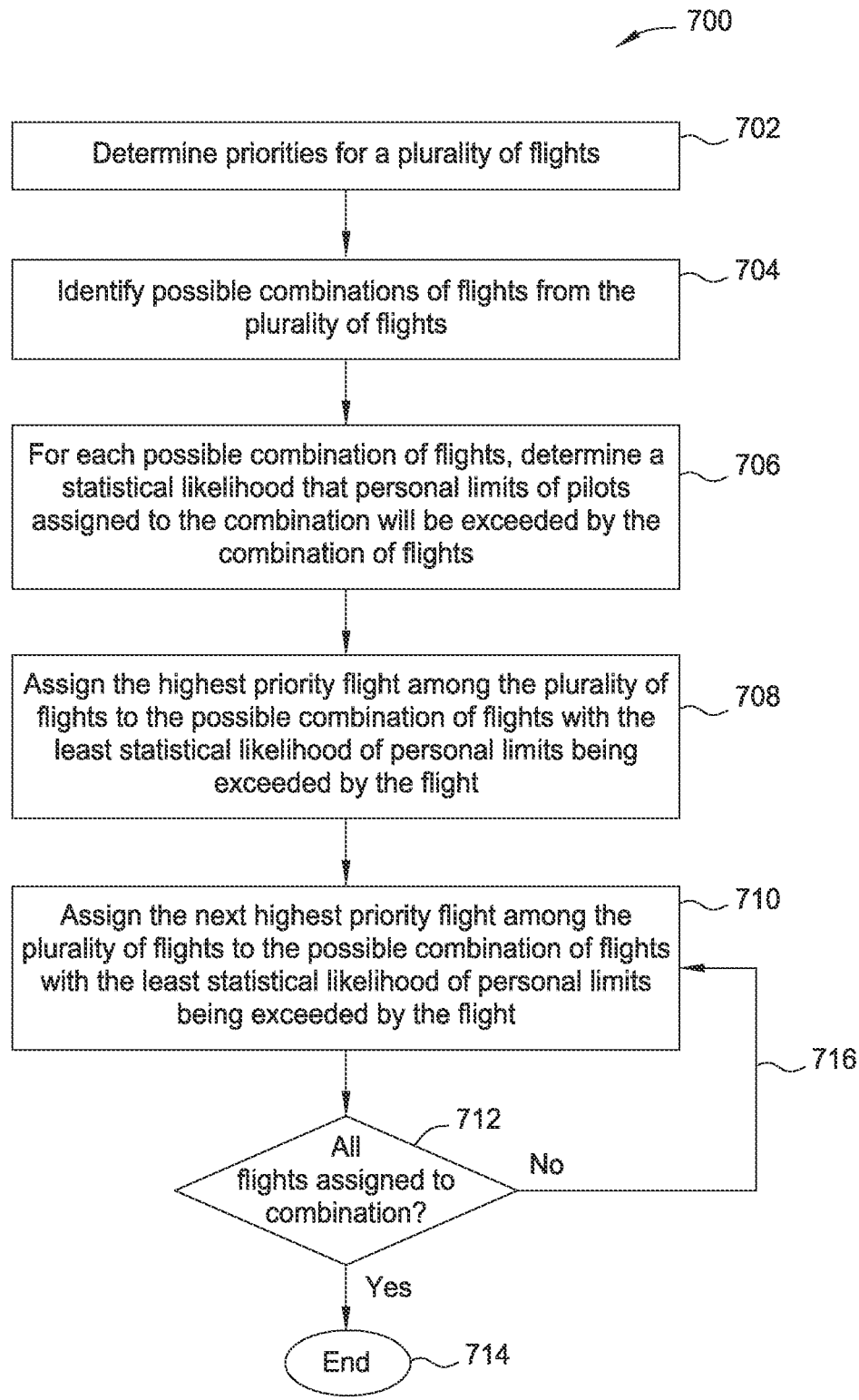
FIG. 7A is block diagram of a method for assigning future instances of flight segments to combinations of flight segments based on a likelihood that a combination will cause a pilot assigned to the combination to exceed a personal limit and based on a priority of the flight segment.

FIG. 7A illustrates a process 700 by which flight segments can be assigned to combinations of flight segments in a manner that the highest priority flight segments are assigned to the least risky combination(s). In block 702, priorities for a plurality of flight segments can be determined. As described above with reference to FIGS. 5A and 5B, the priorities for the flight segments can be based on objective criteria, subjective criteria, or a combination of objective and subjective criteria. In block 704, possible combinations of flight segments of the plurality of flight segments are identified. In block 706, for the different possible combinations of flight segments, a likelihood that personal limits will be exceeded by the combination of flight segments can be determined. For example, a first combination of flight segments may have a 95% chance of not exceeding the personal limits of a pilot, based on past instances of the flight segments in the combination, and a second combination may have a 99% chance of not exceeding the personal limits. In block 708, the highest priority flight segment is identified and assigned to the combination of flight segments with the lowest risk of personal limits being exceeded by the flight segments. As described above with reference to FIG. 5B, in various instances, the highest priority flight segment may be in a group of flight segments that are identified as being highest priority. For example, in FIG. 5B, a flight segment with an overall rank of 1 to 2.5 is considered to be highest priority. Furthermore, the highest priority flight segments may have different tolerable risk levels than medium priority or low priority flight segments. In such instances, the high-priority flight segments may be assigned to any one of a group of possible combinations of flight segments which have risk levels that satisfy the tolerable risk levels for a high-priority flight segment. In various other instances, flight segments may be ranked in a manner such that there is an identifiable highest priority flight segment amongst the plurality of flight segments. In such an instance, the highest priority flight segments may be assigned to the possible combination of flight segments which has the lowest risk level.

After the highest priority flight segment in block 710 has been assigned to a combination of flight segments, the process 700 can proceed to assign the remaining flight segments to combinations of flight segments in rank order based on priority of the flight segment. In block 710, the process 700 can identify the next highest priority flight segment from among the plurality of flight segments and assign this flight segment to a combination of flight segments that has the lowest risk of personal limits being exceeded by the flight segments. It is possible that the highest priority flight segment and the next-highest priority flight segment could be assigned to the same combination of flight segments or to different combinations of flight segments. In block 712, the process 700 determines whether all flight segments have been assigned to combinations of flight segments. If so, then in block 714, the process 700 ends. If additional flight segments have not been assigned to combinations of flight segments in block 712, then the process 700 returns to block 710 and continues to assign flight segments to combinations of flight segments by selecting the next highest priority flight segment and assigning flight segment to the possible combination of flight segments that is least likely to exceed personal limits.

In various instances, after the process 700 ends, the combinations of flight segments can be assigned to itineraries. Then, flight segment crews can be assigned to the itineraries.

Figure 7B:
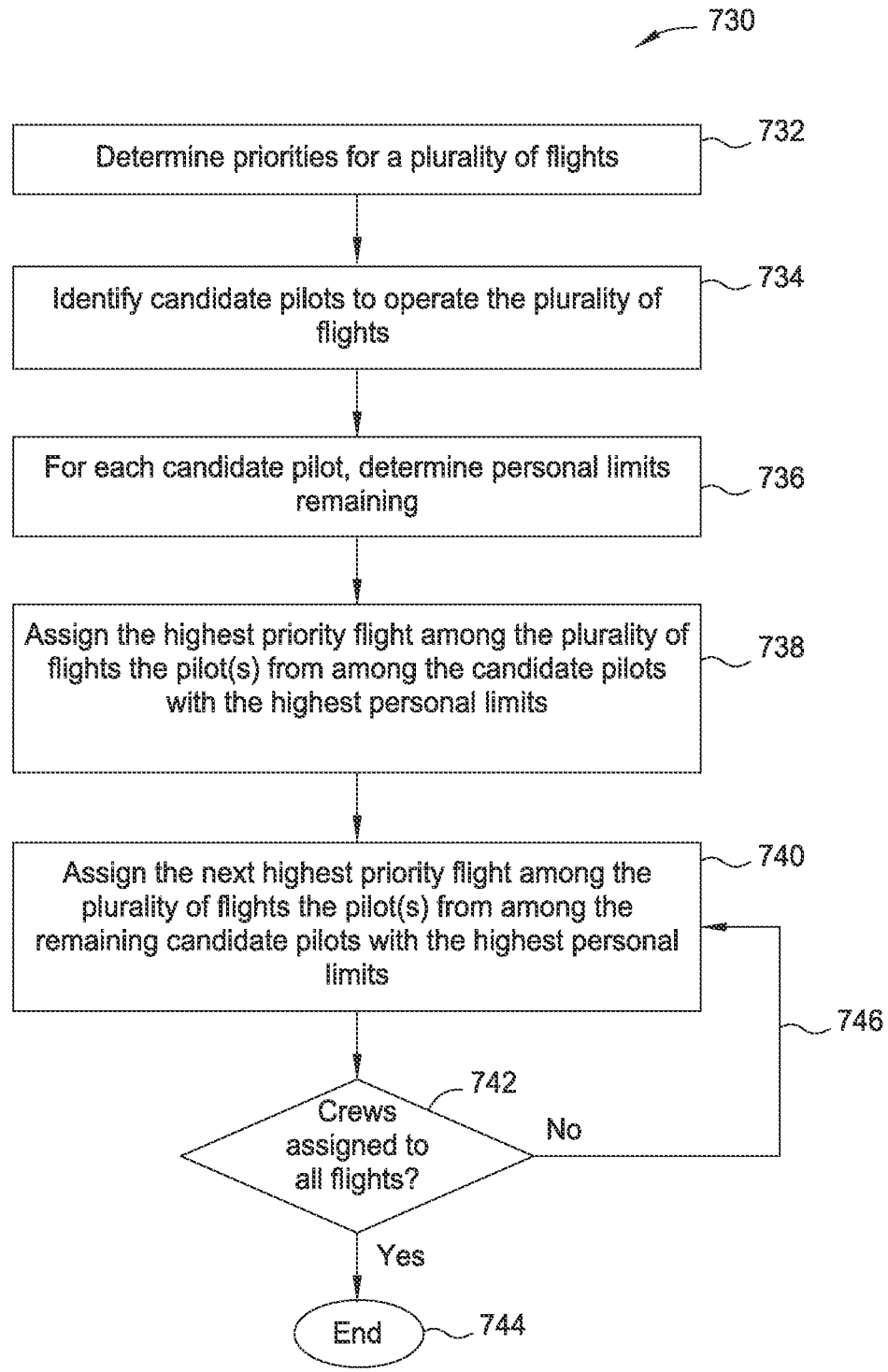
FIG. 7B is a block diagram of a method for assigning pilots to future instances of flight segments based on a priority of the flight segment and based on pilots having the highest available personal limits.

In various aspects, it is possible that an airline may know the priority of its flight segments but may not have the information to determine the likelihood that a pilot's personal limits will be exceeded by a particular flight segment (based on the pilot's flight segments leading up to the particular flight segment). In such instances, pilots could be assigned to the flight segments based on available personal limits. Referring to FIG. 7B, a process 730 can begin in block 732 by determining the priorities for a plurality of flight segments. In block 734, candidate pilots to perform the plurality of flight segments can be identified. In block 736, for the candidate pilots remaining, personal limits can be determined (e.g., based on block time, duty time, rest time, or the like). In block 738, the pilots with likely the most remaining personal limits can be assigned to the highest priority flight segments. In various aspects, pilots could be sorted into ranges of available personal time for flight scheduling purposes for example, if a first pilot has two hours of remaining block time at a second pilot has five hours of remaining block time, then it could be advantageous to reserve the second pilot for longer flight segments (e.g., flight segments of three or four hours in length) and to use the first pilot for shorter flight segments (e.g., flight segments of approximately one hour). After pilots have been assigned to the highest priority flight segment, then in block 740, pilots (from among the remaining pilots) with the next most remaining personal limits are assigned to the next highest priority flight segment. In block 742, the process 730 queries whether crews have been assigned to all flight segments. If so, then in block 744 the process 730 ends.

Returning to block 742, if additional flight segments have not been assigned to crews, then the process 730 returns to block 740.

Figure 8:
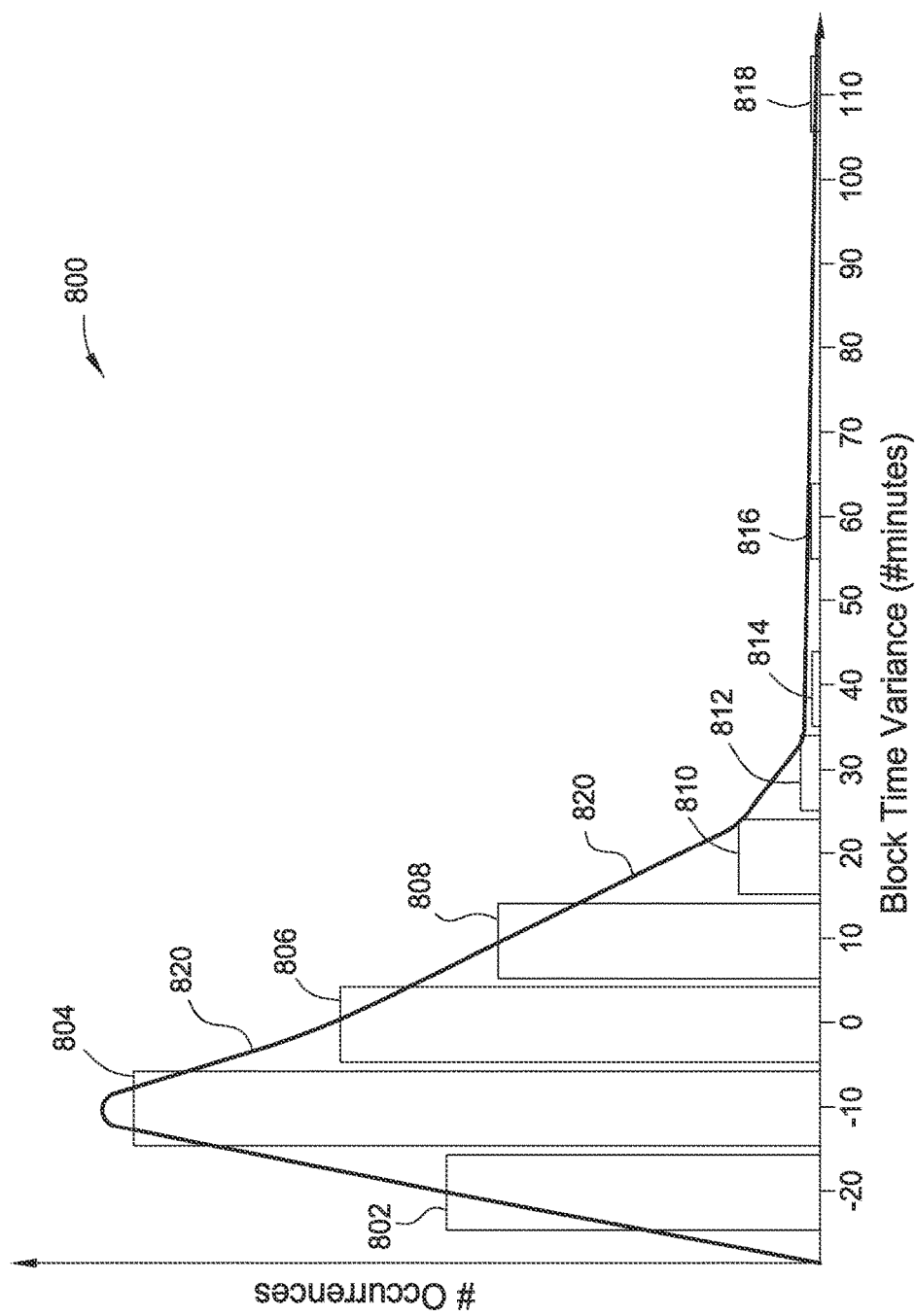
FIG. 8 is an exemplary chart illustrating numbers of occurrences of block time variances for a particular flight segment and a Gumbel distribution for the block time variances.

Referring now to FIG. 8, statistical methods can be applied to data for past instances of various operations to identify time variances. FIG. 8 illustrates a bar chart 800 that illustrates exemplary block time variances for past instances of a particular hypothetical flight segment. Bar 802 shows a number of instances in which the block time for the flight segment was up to 20 minutes less than scheduled, bar 804 shows a number of instances in which the block time for the flight segment was up to 10 minutes less than scheduled, and bar 806 shows a number of instances in which the block time for the flight segment was equal to the scheduled block time. Bar 808 shows a number of instances in which the block time for the flight segment was up to 10 minutes longer than scheduled, bar 810 shows a number of instances in which the block time for the flight segment was up to 20 minutes longer than scheduled, bar 812 shows a number of instances in which the block time for the flight segment was up to 30, minutes longer than scheduled, bar 814 shows a number of instances in which the block time for the flight segment was up to 40 minutes longer than scheduled, bar 816 shows a number of instances in which the block time for the flight segment was up to 60 minutes longer than scheduled, and bar 818 shows a number of instances in which the block time for the flight segment was up to 110 minutes longer than scheduled. The data shown in FIG. 8 is merely illustrative. In various instances, the data could have different levels of granularity (e.g., one minute, two minutes, five minutes, or thirty minutes).

FIG. 8 also shows an exemplary statistical distribution curve, a Gumbel distribution curve, 820 based on the block time variances. The Gumbel distribution is also known as the log-Weibull distribution or the double exponential distribution. The Gumbel distribution statistically approximates the block time variances for the flight operation. The Gumbel distribution is defined by equation (1) below:

$$f(t) = \frac{1}{\beta} e^{-\frac{t-\mu}{\beta}} e^{-e^{-\frac{t-\mu}{\beta}}}, \tag{1}$$

wherein μ is the mode of the time variances and β is a scale parameter. The mean of the time variances is defined by equation (2) below:

$$\text{mean} = \mu + \gamma\beta, \tag{2}$$

wherein γ is the Euler-Mascheroni constant, which is approximately equal to 0.57777.

Figure 9A:
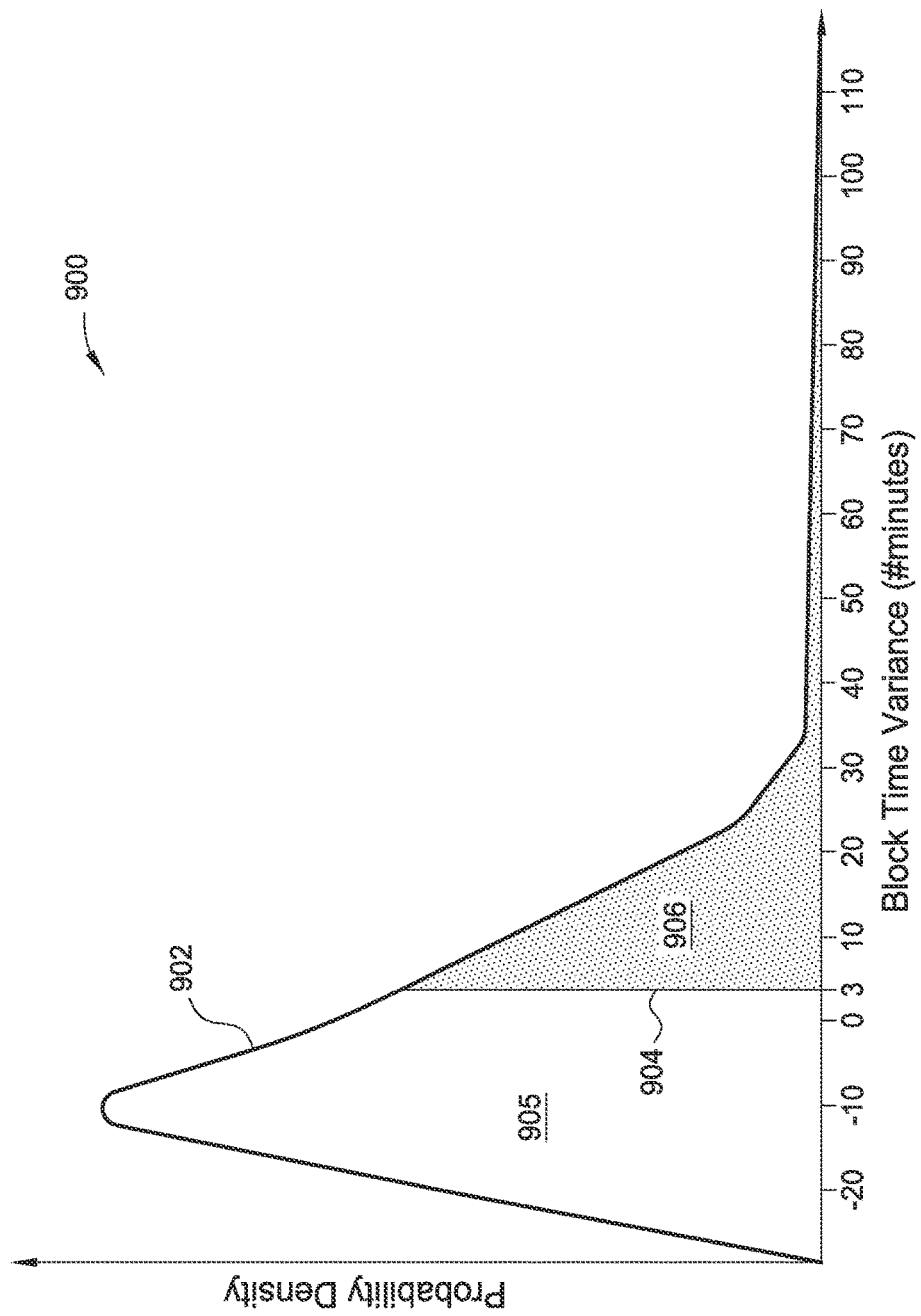
FIG. 9A is an exemplary chart illustrating a probability density function based on the Gumbel distribution shown in FIG. 8 and an 80% confidence interval associated with the probability density function.

After the Gumbel distribution curve 820 for block time variances for a flight segment has been calculated, block time variances based on different confidence intervals can be calculated. FIGS. 9A-9D illustrate a probability density function curve 902, based on the Gumbel distribution curve 820. FIG. 9A illustrates the probability density function (PDF) curve 902 with a vertical line 904 intersecting the curve 902 that separates the top 20% of the area 906 under the curve 902 from the remaining 80% of the area 905 under the curve 902. The vertical line 904, in this exemplary flight segment, intersects the block time variance axis at approximately 3 minutes. Thus, the block time variance with an 80% confidence interval is 3 minutes. In various instances, the vertical line 904 may not cross the block time variance axis at a whole number. For example, the vertical line 904 could cross the block time variance axis at 2.78 minutes. In such instances, it may be advantageous to round the block time variance for the confidence interval up to the next whole number (e.g., 3 minutes in this instance).

Figure 9B:
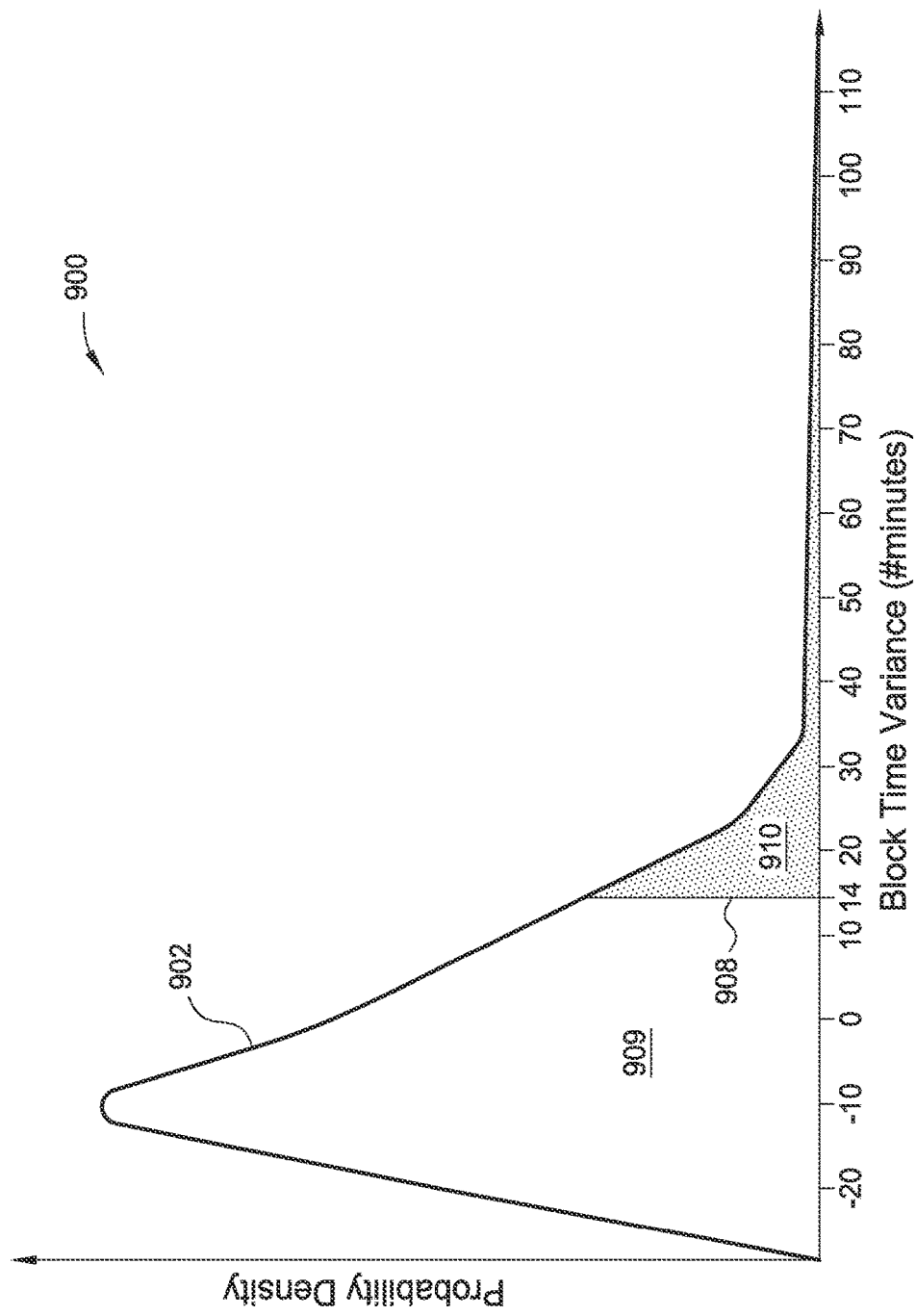
FIG. 9B is an exemplary chart illustrating a probability density function based on the Gumbel distribution shown in FIG. 8 and an 90% confidence interval associated with the probability density function.
Figure 9C:
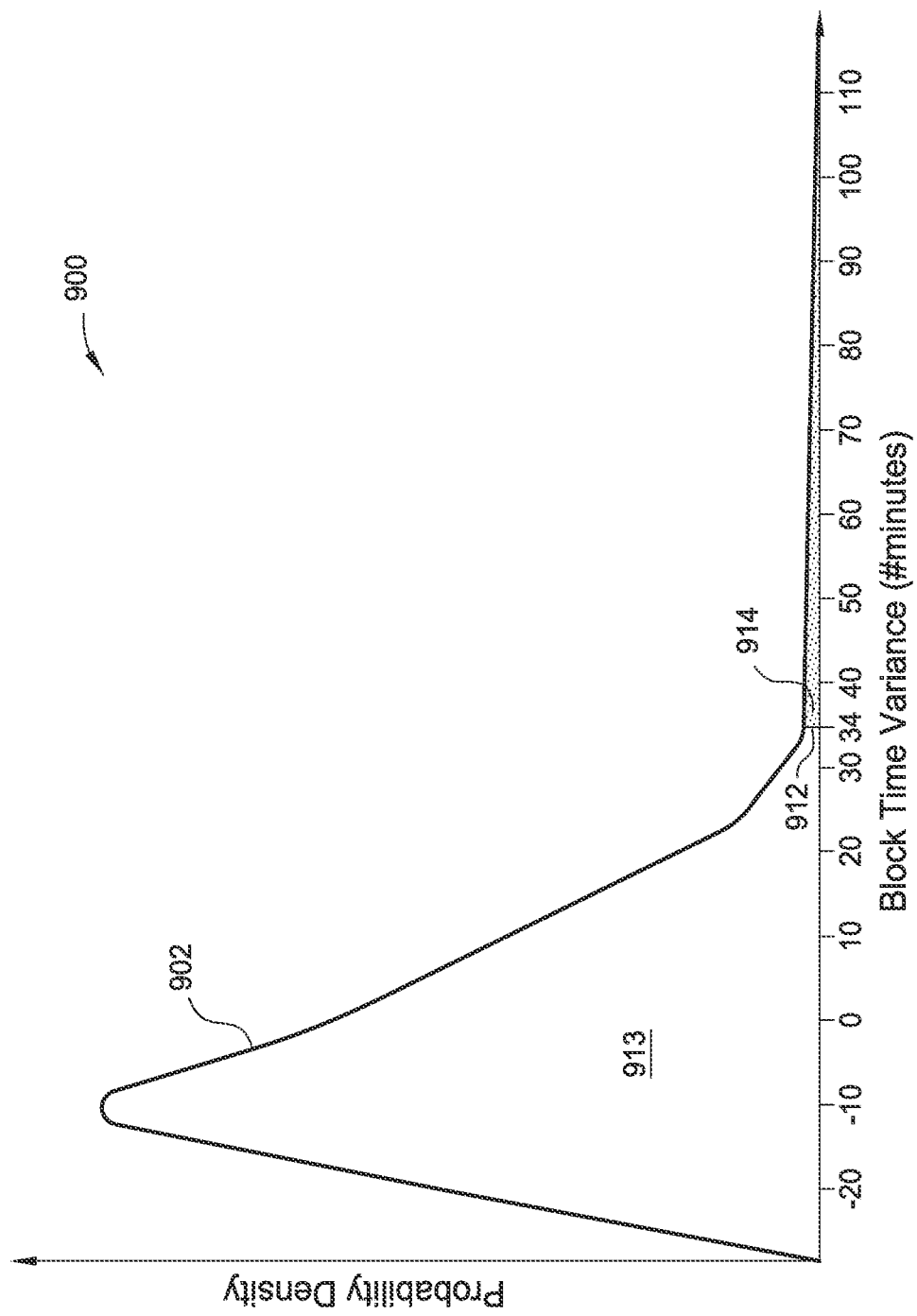
FIG. 9C is an exemplary chart illustrating a probability density function based on the Gumbel distribution shown in FIG. 8 and an 95% confidence interval associated with the probability density function.
Figure 9D:
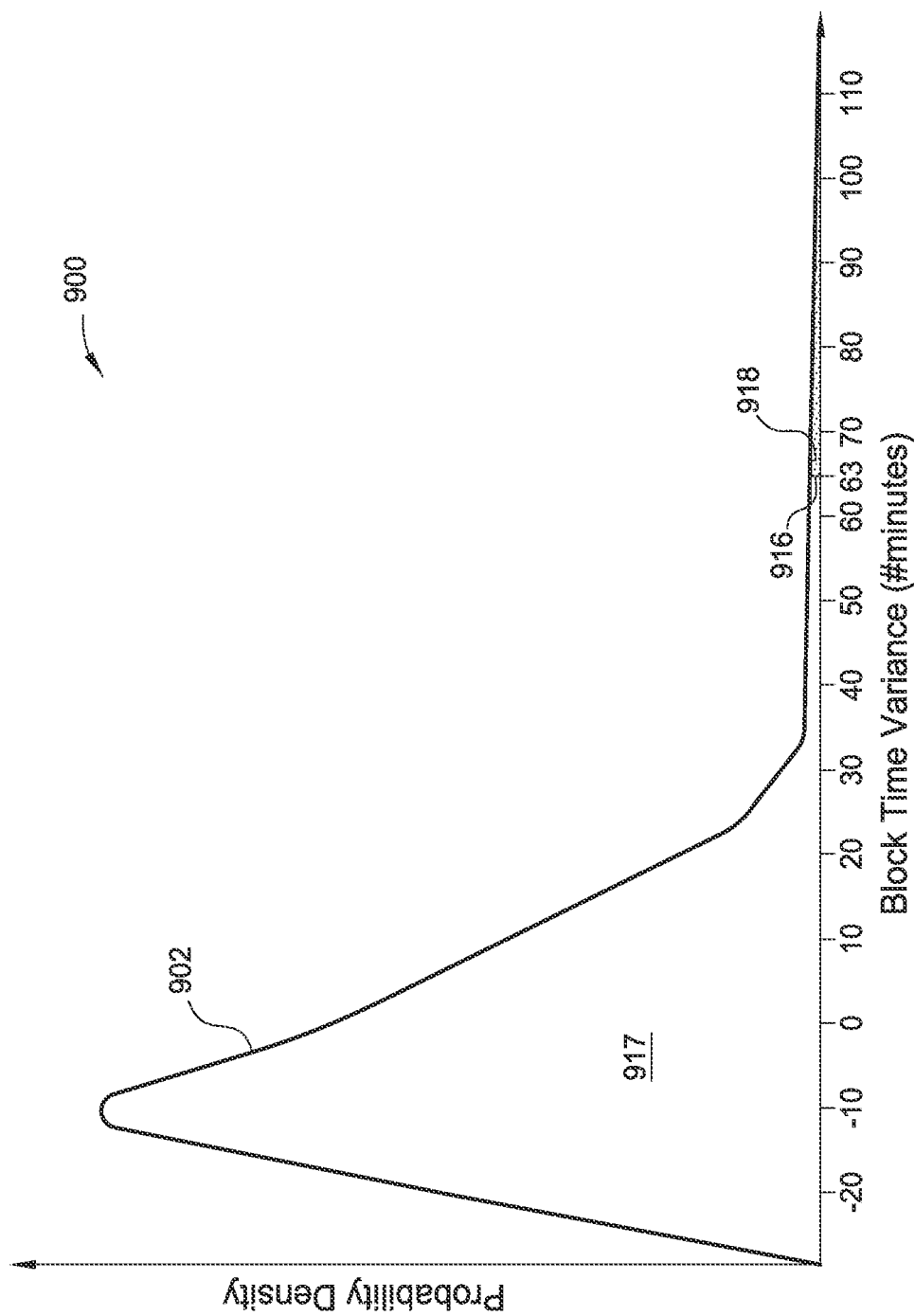
FIG. 9D is an exemplary chart illustrating a probability density function based on the Gumbel distribution shown in FIG. 8 and an 97% confidence interval associated with the probability density function.

FIG. 9B illustrates the PDF curve 902 with a vertical line 908 intersecting the curve 902 that separates the top 10% of the area 910 under the curve 902 from the remaining 90% of the area 909 under the curve 902. The vertical line 908, in this exemplary flight segment, intersects the block time variance axis at approximately 14 minutes. Thus, the block time variance with a 90% confidence interval is 14 minutes. FIG. 9C illustrates the PDF curve 902 with a vertical line 912 intersecting the curve 902 that separates the top 5% of the area 914 under the curve 902 from the remaining 95% of the area 913 under the curve 902. The vertical line 912, in this exemplary flight segment, intersects the block time variance axis at approximately 34 minutes. Thus, the block time variance with a 95% confidence interval is 34 minutes. FIG. 9D illustrates the PDF curve 902 with a vertical line 916 intersecting the curve 902 that separates the top 3% of the area 918 under the curve 902 from the remaining 97% of the area 917 under the curve 902. The vertical line 916, in this exemplary flight segment, intersects the block time variance axis at approximately 63 minutes. Thus, the block time variance with a 97% confidence interval is 63 minutes.

The data and statistical analysis described above with reference to FIGS. 8 and 9A-9D can be updated regularly. For example, the data may be updated daily, weekly, or monthly by adding data for recently-flown flight segments to previously-gathered data. The oldest data may be retained or discarded. For example, in some instances, the oldest data may not reflect reality anymore and its inclusion would skew the resulting statistical analysis away from a realistic result. For example, over time, a particular airport may become busier or less busy as flights (by one or more airlines and other operators) are added or removed. The oldest data may provide data on block time variances before such a change in airport traffic occurs. If traffic at a particular airport increases over a period of time, the earliest data may reduce the block time variances from what they should be. Alternatively, if traffic at a particular airport decreases over a period of time, the earliest data may increase the bock time variances from what they should be. Eliminating the oldest data may reduce such skews in the resulting statistical analysis that results in the Gumbel distributions and PDFs for the flight segments.

FIG. 10 illustrates a table 1000 with exemplary confidence intervals for various flight segments. For example, row 1002 pertains to the flight segment referred to in FIGS. 8 and 9A-9D. Referring to the columns from left to right, the table 1000 includes a flight number for the flight that may be provided by an airline, a departure airport, and an arrival airport. In this exemplary table 1000, the flight segment in row 1002 has flight number 111, departs from John F Kennedy International Airport (JFK) in New York City, N.Y. and arrives at Los Angeles International Airport (LAX) in Los Angeles, Calif. The table 1000 next indicates the aircraft type for the flight segment. In this case, a Boeing 737 aircraft is used by the airline to fly the flight segment in row 1002. The table 1000 next indicates the day of the week of the flight segment. In this case, the flight segment in row 1002 is flown on Monday. The table 1000 next indicates a start-of-range and an end-of-range for the departure time, respectively. In this case, for the flight segment in row 1002, the departure time start-of-range is 6:00 AM and the departure time end-of-range is 8:00 AM. Allowing a range of departure times can accommodate variations to the departure time. For example, the flight segment in row 1002 may be scheduled to depart at 6:30 AM, but may depart a little later in some instances due to delays or a little earlier. Thus, allowing a range of departure times enables a flight segment that departs at 6:30 AM to be grouped together with a flight that departs at 6:35 AM, for example. The table 1000 next indicates block time variances for an 80% confidence interval, a 90% confidence interval, a 95% confidence interval, and a 97% confidence interval, respectively. In this case, the flight segment in row 1002 has the same block time variances described above with respect to FIGS. 8 and 9A-9D. The block time variances are: 3 minutes based on an 80% confidence; 14 minutes based on a 90% confidence interval; 34 minutes based on a 95% confidence interval; and 63 minutes based on a 97% confidence interval.

Rows 1004-1028 of the table 1000 illustrate data for past instances of other flight segments. For example, rows 1004-1014 illustrate the same flight segment (i.e., flight number 111 from JFK to LAX, flying on a Boeing 737 aircraft, and departing between 6:00 AM and 8:00 AM) on different days of the week. The block time variances on Tuesday (row 1004), Thursday (row 1008), and Friday (row 1010) are the same as the block time variances on Monday (row 1002), described above. Specifically, the block time variances are: 3 minutes based on an 80% confidence; 14 minutes based on a 90% confidence interval; 34 minutes based on a 95% confidence interval; and 63 minutes based on a 97% confidence interval. The block time variances for Wednesday (row 1006) for flight segment 111 are different than the block time variances for the other weekdays. Specifically, the block time variances are: 5 minutes based on an 80% confidence; 17 minutes based on a 90% confidence interval; 38 minutes based on a 95% confidence interval; and 69 minutes based on a 97% confidence interval. Similarly, the block time variances for Saturday (row 1012) and Sunday (row 1014) are different than the weekdays. Specifically, the block time variances are: 1 minute based on an 80% confidence; 5 minutes based on a 90% confidence interval; 10 minutes based on a 95% confidence interval; and 15 minutes based on a 97% confidence interval.

In the examples described above with reference to FIGS. 8 and 9A-9D, confidence intervals of 80%, 90%, 95%, and 97% are used. In various aspects, different confidence intervals may be suitable. For example, in various applications, a 99% confidence interval may be suitable. Similarly, in various applications, a 75% confidence interval could be suitable.

The table 1000 also illustrates additional flight segments. For example, rows 1016-1024 illustrate data for past instances of flight segments for flight 222 from JFK to LAX on Monday through Friday, respectively, that departed between 11:00 AM and 1:00 PM. The block time variances for flight 222 on Monday through Friday are different than the block times for flight number 111. Specifically, the block time variances for flight number 222 on Monday (row 1016), Tuesday (row 1018), Thursday (row 1022), and Friday (row 1024) are: 5 minutes based on an 80% confidence; 18 minutes based on a 90% confidence interval; 39 minutes based on a 95% confidence interval; and 67 minutes based on a 97% confidence interval. The block time variances for flight number 222 on Wednesday (row 1020) are: 7 minutes based on an 80% confidence; 22 minutes based on a 90% confidence interval; 46 minutes based on a 95% confidence interval; and 70 minutes based on a 97% confidence interval.

The airline whose flight segments are illustrated in table 1000 may not operate an 11:00 AM flight from JFK to LAX on the weekends. Instead, a flight segment from JFK to LAX may depart between 3:00 PM and 4:00 PM on Saturdays and Sundays and may have flight number 333. Table 1000 illustrates flight number 333 in rows 1026 and 1028. On Saturdays (row 1026), the block time variances for flight number 333 are: 1 minute based on an 80% confidence; 3 minutes based on a 90% confidence interval; 9 minutes based on a 95% confidence interval; and 14 minutes based on a 97% confidence interval. On Sundays (row 1028), the block time variances for flight number 333 are: 1 minute based on an 80% confidence; 3 minutes based on a 90% confidence interval; 8 minutes based on a 95% confidence interval; and 15 minutes based on a 97% confidence interval.

In various aspects, at least some of the flight segments in the table 1000 can be aggregated to reduce table search times. Referring now to FIG. 11A, an aggregation table 1100 can include certain flight segments that have been aggregated or grouped together. Row 1102 of the aggregation table 1100 illustrates aggregated data for Flight 111 for all days of the week. The table includes an asterisk ("*") in the column for day of the week, indicating that any day of the week is included in the row 1102. In this table 1100, the block time variances include the worst block time variances in the aggregated data. In this case, referring again to the table 1000 in FIG. 10, Wednesday has the worst block time variances, so the block time variances for Wednesday are used in row 1102 of the table 1100 of FIG. 11A. The aggregation table 1100 includes an additional column (with respect to table 1000 in FIG. 10), which includes an aggregation number (k"). Described below, the aggregation number can be used as a tag to identify the proper aggregation row to use when determining the block time variances to use. In the exemplary table 1100, row 1102 is assigned an aggregation number (k) of 1. Row 1104 of the aggregation table 1100 illustrates aggregated data for any flight number (indicated by the asterisk) and for any time of day (indicated by the departure time range between midnight and 11:50 PM) that occurs on a Monday. Again referring to FIG. 10, there are two flight segments to include in this row (row 1104) of aggregated data: row 1002 from table 1000 for flight 111 and row 1016 from table 1000 for flight 222. Again, the worst-case block time variances are used. In this case, the block time variances are worse for flight 222 than for flight 111, so the block time variances for flight 222 are used for row 1104. Row 1104 is assigned an aggregation number (k) of 2. Row 1106 of the aggregation table 1100 illustrates aggregated data for any flight number (indicated by the asterisk) and for any time of day (indicated by the departure time range between midnight and 11:50 PM) that occurs on a Saturday. Again referring to FIG. 10, there are two flight segments to include in this row (row 1106) of aggregated data: row 1012 from table 1000 for flight 111 and row 1026 from table 1000 for flight 333. Again, the worst-case block time variances are used. In this case, the block time variances are worse for flight 111 than for flight 333, so the block time variances for flight 111 are used for row 1106. Row 1106 is assigned an aggregation number (k) of 3. Row 1108 of the aggregation table 1100 illustrates aggregated data for any flight number (indicated by the asterisk) and for any day of the week (indicated by the asterisk) from JFK to LAX with a departure time between 6:00 AM and 2:00 PM. Again referring to FIG. 10, any of the flight segments for flight 111 and the flight segments for flight 222 are included in this aggregated row 1108. Again, the worst-case block time variances are used. In this case, the block time variances are worse for flight 222 on Wednesday than for any other flight segments in the aggregated group, so the block time variances for flight 222 on Wednesday are used for row 1108. Row 1108 is assigned an aggregation number (k) of 4.

FIG. 11B illustrates another example of an aggregation table 1120 in which data for flight segments that have similar or identical block time variances are grouped together. For example, referring again to table 1000 in FIG. 10, the block time variances for flight 111 on Monday, Tuesday, Thursday, and Friday are the same. The block time variances for flight 111 are different for Wednesday and Saturday and Sunday. Table 1120 includes a first row 1122 for flight 111 on Wednesdays that includes the block time variances for Wednesdays. Table 1120 includes an aggregation number (k) column. The first row 1122 includes an aggregation number of 1. Table 1120 includes a second row 1124 and a third row 1126 for flight 111 on Saturday and Sunday, respectively, that include the block time variances for Saturdays and Sundays, respectively. Rows 1124 and 1126 include aggregation numbers of 2 and 3, respectively. The table includes a fourth row 1128 that includes the block time variances for Mondays, Tuesdays, Thursdays, and Fridays. Row 1128 includes an aggregation number (k) of 4. Table 1120 also includes aggregated data for flight 222. Again, referring to table 1000 in FIG. 10, the block time variances for flight 222 on Monday, Tuesday, Thursday, and Friday are the same, but the block time variances are different on Wednesdays. Thus, table 1120 in FIG. 11B includes a row 1130 for flight 222 on Wednesdays and a row 1132 for flight 222 on every other weekday (indicated by the asterisk). The data for flight 333 is not aggregated in table 1120 because the block time variances vary for each of the two days.

In the exemplary table 1120, data is aggregated if the block time variances are identical. In various aspects, data could be aggregated if the block time variances are similar, but not identical. For example, block time variances for two flight segments may be determined to be similar if the block time variances for a first flight segment differ by less than two minutes from block time variances for a second flight. The threshold for differences amongst block time variances can be varied depending on the specific circumstances.

Referring again to the method 300 shown in FIG. 3, blocks 302 and 304 can be performed according to the above-described statistical analysis with respect to FIGS. 8 and 9A-9D. After block time variances associated with one or more confidence intervals have been determined (in blocks 302 and 304), flight itineraries for pilots can be determined in block 308. As described above, pilots are limited to a certain number of block time hours in a single duty period. For example, in certain countries, pilots are limited to eight block hours per duty period. Itineraries can be calculated according to Equation (3), wherein an itinerary is valid if:

$$\sum_{i=1}^{n}(\text{sched\_blk\_time}_i+\text{buffer}_i(j,k))\leq \text{blk\_time\_limit}, \quad (3)$$

wherein sched_blk_time is the scheduled block time for flight segment i; buffer is the buffer for flight segment i, based on a specified confidence interval (j) and an aggregation number (k)(if applicable); and blk_time_limit is the pilot's block hour limit (e.g., eight hours). Referring again to FIG. 10, the block time for flight 111 from JFK to LAX on Monday (row 1002 of table 1000) may be five hours. In block 306, one or more confidence intervals can be specified for the flight segments. If the specified confidence interval is 95%, then the buffer would be 34 minutes. Thus, flight 111 would count as 5 hours and 34 minutes against a pilot's block time limit if the flight is assigned to the pilot. Thus, an itinerary that includes flight 111 could include one or more additional flights that have scheduled block times and buffers that total 2 hours and 26 minutes or less. After an itinerary has been determined, the itinerary can be assigned to a pilot in block 310. In various instances in which flight segments are aggregated, the aggregation number can also be included. Referring to the table 1120 in FIG. 11B, if scheduling a Monday flight for flight 111, row 1128, which is an aggregation of data for flight 111 on Mondays, Tuesdays, Thursdays, and Fridays, could be used. Thus, the aggregation number (k) associated with the flight would be 4 according to the table 1120.

In various aspects, every flight segment could use the same confidence interval (block 306). In various other aspects, different flight segments could use different confidence intervals. For example, high ranking flights could use a 97% confidence interval and low ranking flights could use a 90% confidence interval.

The above-described aspects can be applicable to other groups of operators than pilots. For example, aspects can be used to schedule train operators, flight attendants, harbor pilots, etc. As another example, aspects can be used to schedule surgeons for elective surgical procedures to ensure that surgeons do not become overly tired during a duty period.

The descriptions of the various aspects have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein.

In the preceding paragraphs, reference is made to aspects presented in this disclosure. However, the scope of the present disclosure is not limited to specific described aspects. Instead, any combination of the preceding features and elements, whether related to different aspects or not, is contemplated to implement and practice contemplated aspects. Furthermore, although aspects disclosed herein may achieve advantages over other possible solutions or over the prior art, whether or not a particular advantage is achieved by a given aspect is not limiting of the scope of the present disclosure. Thus, the preceding aspects, features, and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects may take the form of an entirely hardware aspect, an entirely software aspect (including firmware, resident software, micro-code, etc.) or an aspect combining software and hardware aspects that may all generally be referred to herein as a "circuit," "module" or "system."

Aspects may be a system, a method, and/or a computer program product. The computer program product may include a computer readable storage medium (or media) having computer readable program instructions thereon for causing a processor to carry out aspects described herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present aspects may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects disclosed herein. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Aspects may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the aspects disclosed herein, a user may access applications (e.g., a crew scheduling application) or related data available in the cloud. For example, the crew scheduling application could execute on a computing system in the cloud and analyze historical flight segment data to identify time variances. In such a case, the analysis of historical data could operate on historical flight segment information stored at a storage location in the cloud. A resulting crew schedule could also be stored at a storage location in the cloud. Doing so allows a user to access this information from any computing system attached to a network connected to the cloud (e.g., the Internet).

While the foregoing is directed to aspects, other and further aspects may be devised without departing from the basic scope thereof, and the scope thereof is determined by the claims that follow.

What is claimed is:

1. A computer-implemented method for assigning various operations to an itinerary, the method comprising:
    determining statistical distributions for time variances associated with each operation of the various operations based on time variances during past instances of the various operations, wherein time variances are variances from scheduled times for the various operations;
    determining a plurality of time variance buffers associated with each operation of the various operations based on the statistical distribution associated with the respective operation, each time variance buffer associated with at least one confidence interval of a plurality of confidence intervals;
    storing the time variance buffers in a computer database, wherein at least some of the time variance buffers are stored in aggregated form in the computer database such that a time variance buffer associated with at least two operations of the various operations is stored in one row, identified by an aggregation number, of a table in the computer database;
    retrieving the aggregated time variance buffers from the computer database by using the aggregation number as a tag that identifies the proper aggregation row of aggregated time variance buffers to use;
    determining a priority for at least one of the various operations;
    selecting at least one confidence interval of the plurality of confidence intervals based on the priority;
    selecting time variance buffers for the various operations, based on the retrieved aggregated time variance buffers and the selected at least one confidence interval for the various operations;
    identifying, by operation of one or more computer processors, a combination of operations from among the various operations wherein a sum of scheduled times for the combination of operations and the determined time variance buffers for the combination of operations do not exceed a personal time limit of personnel; and
    assigning the identified combination of operations to an itinerary.

2. The method of claim 1, wherein the scheduled times for the various operations include scheduled block times for the various operations, and wherein the time variances include block time variances for the various operations.

3. The method of claim 1, wherein the various operations are flight segments of a commercial aircraft, wherein the combination of operations is a combination of flight segments, wherein the personnel are pilots, wherein the time variances are block time variances, and wherein the personal time limit is an available block time.

4. The method of claim 1, wherein the various operations are flight segments of a commercial aircraft, wherein the combination of operations is a combination of flight segments, wherein the personnel are pilots, wherein the time variances are arrival time variances, and wherein the personal time limit is a predicted time for a pilot assigned to the itinerary to run out of duty time.

5. The method of claim 1, wherein selecting at least one confidence interval comprises selecting a single confidence interval for all of the various operations.

6. The method of claim 1, wherein selecting a confidence interval comprises selecting a first confidence interval for a first one of the various operations and selecting a second confidence interval for a second one of the various operations, and wherein the first confidence interval is different than the second confidence interval.

7. A system, comprising:
   memory storing past instances of various operations; and
   a processor configured to:
      determine a priority for at least one of the various operations;
      receive a selection of at least one confidence interval of a plurality of confidence intervals, based on the priority; and
      analyze the past instances of various operations to determine statistical distributions for time variances associated with each operation of the various operations based on time variances during past instances of the various operations, wherein the time variances are variances from scheduled times for the various operations;
      determine a plurality of time variance buffers associated with each operation of the various operations based on the statistical distribution associated with the respective operation, each time variance buffer associated with at least one confidence interval of a plurality of confidence intervals;
      store the time variance buffers in a computer database, wherein at least some of the time variance buffers are stored in aggregated form in the computer database such that a time variance buffer associated with at least two operations of the various operations is stored in one row, identified by an aggregation number, of a table in the computer database;
      retrieve the aggregated time variance buffers from the computer database by using the aggregation number as a tag that identifies the proper aggregation row of aggregated time variance buffers to use;
      select time variance buffers for the various operations, based on the retrieved aggregated time variance buffers and the received selection of at least one confidence interval for the various operations;
      identify a combination of operations from among the various operations wherein a sum of scheduled times for the combination of operations and the determined time variance buffers for the combination of operations do not exceed a personal time limit of personnel; and
      assign the identified combination of operations to an itinerary.

8. The system of claim 7, wherein the scheduled times for the various operations include scheduled block times for the various operations, and wherein the time variances include block time variances for the various operations.

9. The system of claim 7, wherein the various operations are flight segments of a commercial aircraft, wherein the combination of operations is a combination of flight segments, wherein the personnel are pilots, wherein the time variances are block time variances, and wherein the personal time limit is an available block time.

10. The system of claim 7, wherein the various operations are flight segments of a commercial aircraft, wherein the combination of operations is a combination of flight segments, wherein the personnel are pilots, wherein the time variances are arrival time variances, and wherein the personal time limit is a predicted time for a pilot assigned to the itinerary to run out of duty time.

11. The system of claim 7, wherein the processor receives a first confidence interval for a first one of the various operations and a second confidence interval for a second one of the various operations, and wherein the first confidence interval is different than the second confidence interval.

12. A computer program product for assigning personnel to various operations, the computer program product comprising:
   a computer-readable storage medium having computer-readable program code embodied therewith, the computer-readable program code executable by one or more computer processors to:
   determine a priority for at least one of the various operations;
   receive a selection of at least one confidence interval of a plurality of confidence intervals, based on the priority; and
   analyze the past instances of various operations to determine statistical distributions for time variances associated with each operation of the various operations based on time variances during past instances of the various operations, wherein the time variances are variances from scheduled times for the various operations;
   determine a plurality of time variance buffers associated with each operation of the various operations based on the statistical distribution associated with the respective operation, each time variance buffer associated with at least one confidence interval of a plurality of confidence intervals;
   store the time variance buffers in a computer database, wherein at least some of the time variance buffers are stored in aggregated form in the computer database such that a time variance buffer associated with at least two operations of the various operations is stored in one row, identified by an aggregation number, of a table in the computer database;
   retrieve the aggregated time variance buffers from the computer database by using the aggregation number as a tag that identifies the proper aggregation row of aggregated time variance buffers to use;
   select time variance buffers for the various operations, based on the retrieved aggregated time variance buffers and the received selection of at least one confidence interval for the various operations;
   identify a combination of operations from among the various operations wherein a sum of scheduled times for the combination of operations and the determined time variance buffers for the combination of operations do not exceed a personal time limit of personnel; and
   assign the identified combination of operations to an itinerary.

13. The computer program product of claim 12, wherein the scheduled times for the various operations include scheduled block times for the various operations, and wherein the time variances include block time variances for the various operations.

14. The computer program product of claim 12, wherein the various operations are flight segments of a commercial aircraft, wherein the combination of operations is a combination of flight segments, wherein the personnel are pilots, wherein the time variances are block time variances, and wherein the personal time limit is an available block time.

15. The computer program product of claim 12, wherein the various operations are flight segments of a commercial aircraft, wherein the combination of operations is a combination of flight segments, wherein the personnel are pilots, wherein the time variances are arrival time variances, and wherein the personal time limit is a predicted time for a pilot assigned to the itinerary to run out of duty time.

16. The computer program product of claim 12, wherein the computer program product receives a single confidence interval for all of the various operations.

17. The computer program product of claim 12, wherein the computer program product receives a first confidence interval for a first one of the various operations and selecting a second confidence interval for a second one of the various operations, and wherein the first confidence interval is different than the second confidence interval.

* * * * *